(12) United States Patent
Choi et al.

(10) Patent No.: US 11,961,962 B2
(45) Date of Patent: Apr. 16, 2024

(54) SOLID ION CONDUCTOR COMPOUND, SOLID ELECTROLYTE INCLUDING THE SAME, ELECTROCHEMICAL CELL INCLUDING THE SAME, AND PREPARATION METHOD THEREOF

(71) Applicant: Samsung Electronics Co., Ltd., Suwon-si (KR)

(72) Inventors: Wonsung Choi, Hwaseong-si (KR); Gabin Yoon, Jeollanam-do (KR); Tomoyuki Tsujimura, Kanagawa (JP); Toshinori Sugimoto, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 179 days.

(21) Appl. No.: 17/209,579

(22) Filed: Mar. 23, 2021

(65) Prior Publication Data
US 2022/0006116 A1 Jan. 6, 2022

(30) Foreign Application Priority Data
Jul. 2, 2020 (KR) .................. 10-2020-0081673

(51) Int. Cl.
*H01M 10/0562* (2010.01)
*C01F 17/36* (2020.01)
*H01M 10/0525* (2010.01)

(52) U.S. Cl.
CPC ......... *H01M 10/0562* (2013.01); *C01F 17/36* (2020.01); *H01M 10/0525* (2013.01); *H01M 2300/008* (2013.01)

(58) Field of Classification Search
CPC ....... H01M 10/05–0525; H01M 10/056–0562; H01M 10/058–0587;
(Continued)

(56) References Cited

U.S. PATENT DOCUMENTS 6,402,795 B1 6/2002 Chu et al.
6,485,622 B1 11/2002 Fu
(Continued)

FOREIGN PATENT DOCUMENTS

CN 109775744 A 5/2019
CN 109950617 A 6/2019
(Continued)

OTHER PUBLICATIONS

Machine Translation of Ha et al. (WO 2019/004714). Originally available Jan. 2019 (Year: 2019).*
(Continued)

*Primary Examiner* — Jonathan Crepeau
*Assistant Examiner* — Jacob Buchanan
(74) *Attorney, Agent, or Firm* — CANTOR COLBURN LLP

(57) ABSTRACT

A solid ion conductor compound including Li, Ho, and a halogen element, wherein the compound has diffraction peaks at 30°2θ to 33°2θ, 33°2θ to 36°2θ, 40°2θ to 44°2θ, and 48°2θ to 52°2θ, when analyzed using CuKα radiation, and wherein a full width at half maximum of at least one peak at 40°2θ to 44°2θ is 0.3°2θ or greater.

22 Claims, 11 Drawing Sheets

(58) Field of Classification Search
CPC .......... H01M 50/40–409; H01M 50/431–437; H01M 50/489; H01M 50/497; C01F 17/30; C01F 17/36; C01P 2002/70–77; H01B 1/06
See application file for complete search history.

(56) References Cited

U.S. PATENT DOCUMENTS

| | | | |
|---|---|---|---|
| 7,901,658 | B2 | 3/2011 | Weppner et al. |
| 8,828,580 | B2 | 9/2014 | Visco et al. |
| 2015/0044575 | A1 | 2/2015 | Kawaji et al. |
| 2018/0006326 | A1 | 1/2018 | O'Neill et al. |
| 2019/0088995 | A1 | 3/2019 | Asano et al. |
| 2020/0075993 | A1 | 3/2020 | Ling et al. |
| 2020/0212478 | A1* | 7/2020 | Sakai .................. H01M 10/052 |
| 2020/0328455 | A1 | 10/2020 | Sakai et al. |
| 2020/0328459 | A1 | 10/2020 | Sakai et al. |
| 2020/0328468 | A1 | 10/2020 | Sakaida et al. |
| 2020/0335817 | A1 | 10/2020 | Asano et al. |
| 2021/0098824 | A1 | 4/2021 | Nishio et al. |
| 2021/0098825 | A1 | 4/2021 | Sakaida et al. |
| 2021/0126284 | A1 | 4/2021 | Sakaida et al. |
| 2022/0006116 | A1 | 1/2022 | Choi et al. |
| 2022/0149426 | A1 | 5/2022 | Yoon et al. |
| 2022/0149430 | A1* | 5/2022 | Choi .................... H01M 4/366 |
| 2022/0216507 | A1* | 7/2022 | Sun ......................... H01M 4/13 |
| 2022/0223904 | A1* | 7/2022 | Choi ................. H01M 10/0562 |

FOREIGN PATENT DOCUMENTS

| | | | | |
|---|---|---|---|---|
| CN | 110137561 | A | | 8/2019 |
| CN | 111146425 | A * | 5/2020 | ........ H01M 10/0562 |
| CN | 111640979 | A * | 9/2020 | .......... H01M 10/052 |
| EP | 3736897 | A1 | | 11/2020 |
| EP | 3863025 | A1 | | 8/2021 |
| EP | 3905273 | A1 | | 11/2021 |
| EP | 3905277 | A1 | | 11/2021 |
| JP | 2006244734 | A | | 9/2006 |
| KR | 101602416 | A | | 3/2016 |
| WO | 2015079509 | A1 | | 6/2015 |
| WO | WO-2019004714 | A1 * | 1/2019 | ............. C01B 25/00 |
| WO | 2019135319 | A1 | | 7/2019 |
| WO | 2019135320 | A1 | | 7/2019 |
| WO | 2019135348 | A1 | | 7/2019 |
| WO | 2020070956 | A1 | | 4/2020 |
| WO | 2020070957 | A1 | | 4/2020 |
| WO | 2020070958 | A1 | | 4/2020 |
| WO | 2020137026 | A1 | | 7/2020 |
| WO | 2020137156 | A1 | | 7/2020 |
| WO | WO-2020220697 | A1 * | 11/2020 | ............. C03B 25/02 |
| WO | 2021070595 | A1 | | 4/2021 |
| WO | 2021131716 | A1 | | 7/2021 |
| WO | 2021217045 | A1 | | 10/2021 |
| WO | 2022018946 | A1 | | 1/2022 |
| WO | 2022018952 | A1 | | 1/2022 |
| WO | 2022019098 | A1 | | 1/2022 |
| WO | 2022019099 | A1 | | 1/2022 |

OTHER PUBLICATIONS

Machine translation of Wang, CN-111146425-A. Originally available May 12, 2020 (Year: 2020).*

Machine translation of Sun, CN-111640979-A. Originally available Sep. 8, 2020 (Year: 2020).*

Bohnsack et al.; "Ternare Halogenide vom Typ A3MX6 VI. Ternare Chloride der Selten-Erd-Elemente mit Lithium, Li3MCl6 (M=Tb—Lu, Y, Sc): Synthese, Kristallstrukturen und Ionenbewegung." Zeitschrift Fur Anorganische und Allgemeine Chemie, vol. 623, Jul. 1, 1997, pp. 1067-1073. With translation. (Year: 1997).*

Bohnsack et al.; "Ternare Halogenide vom Typ A3MX6. VII. Die Bromide Li3MBr6 (M=Sm—Lu, Y): Synthese, Kristallstruktur, Ionenbeweglichkeit", Zeitschrift Fur Anorganische Allgemeine Chemie, vol. 623, Sep. 1, 1997, pp. 1352-1356. With translation. (Year: 1997).*

Shuo Wang et al., "Lithium Chlorides and Bromides as Promising Solid-State Chemistries for Fast Ion Conductors with Good Electrochemical Stability," Communications, Li-Ion Batteries, Agnew. Chem. Int. Ed., 2019, vol. 58, pp. 8039-8043, With Supporting Information.

Yasumasa Tomita et al., "New Lithium Ion Conductor Li3InBr6 Studied by 7Li NMR," Chemistry Letters 1998, vol. 27, No. 3, pp. 223-224.

Xiaona Li et al., "Air-stable Li3InCl6 electrolyte with high voltage compatibility for all-solid-state batteries," Energy & Environmental Science, Aug. 28, 2019, Issue 9, DOI: 10.1039/cpee02311a, pp. 1-7.

Y. Tomita et al., "Substitution Effect for Br on the Lithium Ion Conductivity of Lithium Indium Bromide," ECS Transactions, 2009, vol. 16, No. 29, pp. 137-141.

Yasumasa Tomita et al., "Synthesis and Characterization of Lithium Ion Conductors, Li3InBr6 and Its Substituted Compounds," Defect and Diffusion Forum, Sep. 30, 2005, vols. 242-244, pp. 17-26.

Asano et al., "Solid Halide Electrolytes with High Lithium-Ion Conductivity for Application in 4 V Class Bulk-Type All-Solid-State Batteries", Advanced Materials, vol. 30, 2018, 1803075.

Dongsu Park et al., "Theoretical Design of Lithium Chloride Superionic Conductors for All-Solid-State High-Voltage Lithium-Ion Batteries," ACS Applied Materials & Interfaces, Jul. 9, 2020, pp. 34806-34814, vol. 12.

Ionic radius, Wikipedia, pp. 1-10, Nov. 3, 2021, https://en.wikipedia.org/wiki/Ionic_radius.

Kern-Ho Park et al., "High-Voltage Superionic Halide Solid Electrolytes for All-Solid-State Li-Ion Batteries," ACS Energy Letters, Jan. 9, 2020, pp. 533-539, vol. 5.

Wang et al., "Lithium Chlorides and Bromides as Promising Solid-State Chemistries for Fast Ion Conductors with Good Electrochemical Stability", Angew. Chem. Int. Ed. 58, 2019, 8039-8043.

* cited by examiner

SOLID ION CONDUCTOR COMPOUND, SOLID ELECTROLYTE INCLUDING THE SAME, ELECTROCHEMICAL CELL INCLUDING THE SAME, AND PREPARATION METHOD THEREOF

CROSS-REFERENCE TO RELATED APPLICATION

This application claims priority to Korean Patent Application No. 10-2020-0081673, filed on Jul. 2, 2020, in the Korean Intellectual Property Office, and all the benefits accruing therefrom under 35 U.S.C. § 119, the disclosure of which in its entirety is incorporated herein by reference.

BACKGROUND

1. Field

The present disclosure relates to a solid ion conductor compound, a solid electrolyte including the same, a lithium battery including the same, and a method of preparing the solid ion conductor compound.

2. Description of Related Art

An all-solid lithium battery includes a solid electrolyte as an electrolyte. The high energy density of an all-solid lithium battery is achieved by a solid electrolyte having high ionic conductivity.

Currently available sulfide-based solid electrolytes have high ionic conductivity and good formability, however, there is a problem with stability due to gas generation caused by side reactions between the sulfide-based solid electrolyte and moisture.

A currently available oxide-based solid electrolyte has greater chemical stability, but lower ionic conductivity, than a sulfide-based solid electrolyte, and is still not optimal for forming a high-energy-density all-solid lithium battery.

Accordingly, there remains a need for a solid electrolyte having both high ionic conductivity and excellent chemical stability, and which does not generate gas as the result of side reactions between the solid electrolyte and moisture.

SUMMARY

Provided are a crystalline solid ion conductor compound having excellent lithium ion conductivity.

Additional aspects will be set forth in part in the description which follows and, in part, will be apparent from the description, or may be learned by practice of the presented aspects of the disclosure.

According to an aspect, a solid ion conductor compound includes: Li, Ho, and a halogen, wherein the compound has diffraction peaks at 30°2θ to 33°2θ, 33°2θ to 36°2θ, 40°2θ to 44°2θ, and 48°2θ to 52°2θ, when analyzed using CuKα radiation, and a full width at half maximum (FWHM) of at least one peak at 40°2θ to 44°2θ is 0.3° or greater.

According to another aspect, a solid electrolyte includes the solid ion conductor compound.

According to yet another aspect, an electrochemical cell includes: a cathode layer including a cathode active material layer; an anode layer including an anode active material layer; and an electrolyte layer between the cathode layer and the anode layer, wherein the cathode active material layer, the electrolyte layer, or a combination of both the cathode active material layer and the electrolyte layer includes the solid ion conductor compound.

According to an aspect, a method of preparing a solid ion conductor compound includes: providing a mixture of a lithium precursor and a holmium precursor; and reacting the mixture in a solid phase to obtain the solid ion conductor compound.

BRIEF DESCRIPTION OF THE DRAWINGS

The above and other aspects, features, and advantages of certain aspects of the disclosure will be more apparent from the following description taken in conjunction with the accompanying drawings, in which.

DETAILED DESCRIPTION

Figure 1:
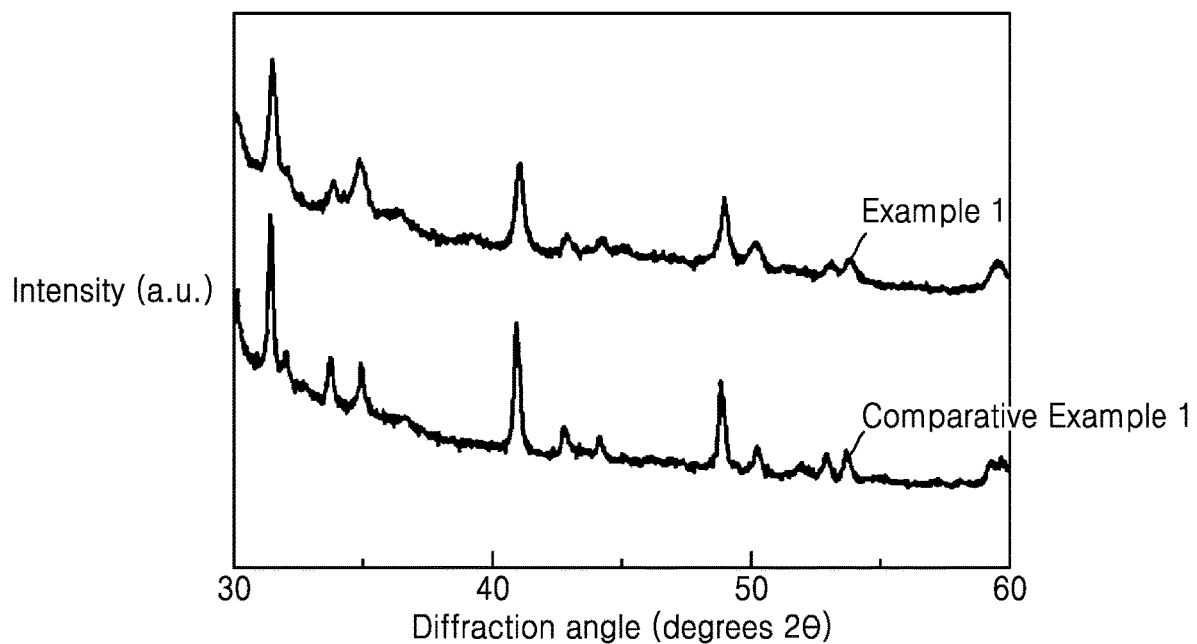
FIG. 1 is a graph of intensity (arbitrary units, a.u.) versus diffraction angle (degrees two-theta, 2θ), which shows the results of X-ray diffraction (XRD) analysis of Example 1 and Comparative Example 1, using CuKα radiation.

Reference will now be made in detail to various aspects, examples of which are illustrated in the accompanying drawings, wherein like reference numerals refer to like elements throughout. In this regard, the present aspects may have different forms and should not be construed as being limited to the descriptions set forth herein. Accordingly, the aspects are merely described below, by referring to the figures, to explain aspects.

Various aspects are illustrated in the accompanying drawings. However, the present disclosure may be embodied in many different forms, and should not be construed as being limited to the aspects described herein. Rather, these aspects are provided such that the present disclosure can be made thorough and complete, and will sufficiently transfer the scope of the present disclosure to those skilled in the art. Like reference numerals refer to like components.

When any element is referred to as being "on" another element, it will be understood that it may be directly on another element or that other elements may be interposed therebetween. In contrast, when any element is referred to as being "directly on" another element, there are no element intervening therebetween.

Although the terms first, second, third, etc. may be used to describe various elements, components, areas, layers and/or regions, it will be understood that these elements, components, areas, layers and/or regions should not be limited by these terms. These terms are only used to distinguish one element, component, area, layer or region from another element, component, area, layer, or region. Accordingly, a first element, component, area, layer, or region described below may be referred to as a second element, component, area, layer, or region without departing from the instructions of this specification.

The terminology used herein is for the purpose of describing particular aspects only and is not intended to be limiting of the inventive concept. The singular form as used herein is intended to include the plural form including "at least one" unless contents are clearly indicated otherwise. "At least one" should not be construed as limiting to the singular form. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. As used herein, the term "and/or" includes any and all combinations of one or more of the listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10%, 5% of the stated value.

Spatially relative terms such as "bottom", "under", "lower", "top", "on", "upper", etc. may be used here to easily describe one component or the relationships of other components having different features. It will be understood that spatially relative terms are intended to include different orientations of devices in use or operation in addition to the orientations shown in the drawings. For example, if the device in the drawing is turned over, a component described as "under" or "below" another component or feature will be oriented "over" the other component or feature. Thus, the exemplary term "under" may include both an upward and downward direction. The devices may be arranged in different directions (rotated 90° or rotated in different directions), and spatially relative terms used herein may be interpreted depending on circumstances thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary aspects are described herein with reference to cross-sectional views that are schematic illustrations of ideal aspects. As such, variations from the shape of the illustration as a result of, for example, manufacturing techniques and/or tolerances should be expected. Accordingly, the aspects described herein should not be construed as limited to specific shapes of regions as illustrated herein, but should include variations in shapes resulting from, for example, manufacturing. For example, regions depicted as flat may typically have rough and/or non-linear features. Moreover, the sharp angles illustrated may be rounded. Accordingly, the regions shown in the figures are schematic in nature, and their shapes are not intended to illustrate the precise shapes of the regions, and are not intended to limit the scope of the claims.

The term "group" when used in reference to the elements in the Periodic Table of the Elements (Periodic Table), means a group of the Periodic Table according to the Group 1 to 18 classification system of the International Union of Pure and Applied Chemistry ("IUPAC").

"Halogen" or "halogen element" means one of the elements of Group 17 of the periodic table (e.g., fluorine, chlorine, bromine, iodine, and astatine).

As used herein, "average particle diameter" or "average particle size" or "D50 particle size" refer to a particle diameter corresponding to 50% of the particles in a distribution curve in which particles are accumulated in the order of particle diameter from the smallest particle to the largest particle and a total number of accumulated particles is 100%. The average particle diameter may be measured by methods known to those of skill in the art, for example, with a particle size analyzer (PSA) using light scattering.

While specific aspects have been described, alternatives, modifications, variations, improvements, and substantial equivalents that are currently unexpected or unforeseeable may occur to the applicant or those skilled in the art. Accordingly, it is intended that the appended claims, as filed and amended, include all such alternatives, modifications, variations, improvements, and substantial equivalents.

Hereinafter, a solid ion conductor compound according to one or more aspects, a solid electrolyte including the solid ion conductor compound, an electrochemical cell including the solid ion conductor compound, and a method of preparing the solid ion conductor compound, will be described in detail.

Solid Ion Conductor Compound

A solid ion conductor compound according to an aspect includes: Li, Ho, and a halogen, wherein the compound has an X-ray diffraction peaks at 30°2θ to 33°2θ, 33°2θ to 36°2θ, 40°2θ to 44°2θ, and 48°2θ to 52°2θ, when analyzed using CuKα radiation, and a full width at half maximum (FWHM) of at least one peak at the diffraction angle of 40°2θ to 44°2θ is about 0.3°2θ or greater.

The solid ion conductor compound may include Li, Ho, and a halogen. While not wanting to be bound by theory, it is understood that the presence of Ho and the halogen in the solid ion conductor compound improves the ionic conductivity of the lithium ions in the compound, and reduces activation energy. The solid ion conductor compound may have a diffraction peak at a diffraction angle (2θ) of 40°2θ to 44°2θ, and the full width at half maximum (FWHM) of at least one peak at the diffraction angle (2θ) of 40°2θ to 44°2θ is about 0.3°2θ or greater, thereby improving the ionic conductivity of lithium ions.

The solid ion conductor compound may additionally include a small amount, for example, a doping amount, of a metal element, which may be a divalent metal, a trivalent metal, a tetravalent metal, or a combination thereof. The solid ion conductor compound has an overall neutral charge.

It has been reported that a Li—In—Cl (LIC) compound or a Li—Y—Cl (LYC) compound, as examples of a halogen-containing (e.g., halogen-based) solid ion conductor compound, have considerable crystallinity and thus have a full width at half maximum of less than 0.3°. Further, the ionic conductivity of lithium ions due to the high levels of crystallization is improved in such compounds.

Also, the solid ion conductor compound according to an aspect of the present disclosure, has a full width at half maximum of about 0.3° or greater, and despite the poor crystallinity of the solid ion conductor compound, the ionic conductivity is rather high. Without being limited by theory, it is believed that the volume of the crystal lattice increases due to the presence of ions having a larger ionic radius than, for example, the Y ions in the LYC compound or In ions in the LIC compound, with the result that the mobility of lithium ions in the crystal lattice may be facilitated. It is also understood that the conductivity of lithium ions between crystalline phases may be improved by including an amorphous phase. Further, since the solid ion conductor compound according to an aspect of the present disclosure includes a halogen element having, for example, a wide electrochemical window and a wide bandgap, the reduction resistance and/or atmospheric stability of the solid ion conductor compound is excellent, and thus structural stability may be improved.

According to an aspect, the solid ion conductor compound may have, in an XRD spectrum, diffraction peaks at diffraction angles (2θ) of 30°2θ±0.5°2θ, 31.5°2θ±0.5°2θ, 35°2θ±0.5°2θ, 41°2θ±0.5°2θ, 48.7°2θ±0.5°2θ and 60°2θ±0.5°2θ, when measured using CuKα radiation.

According to an aspect, the solid ion conductor compound may have an XRD spectrum including diffraction peaks at diffraction angles (2θ) of 30°2θ±0.5°2θ, 31.5°2θ±0.5°2θ, 35°2θ±0.5°2θ, 42°2θ±0.5°2θ, 48.7°2θ±0.5°2θ, and 60°2θ±0.5°2θ when measured using CuKα radiation.

Since the solid ion conductor compound has peaks at the aforementioned diffraction angles, the solid ion conductor compound may have high ionic conductivity and excellent chemical stability.

According to an aspect, the halogen may include F, Cl, Br, I, or a combination thereof.

For example, the halogen element may include Cl. When the solid ion conductor compound contains Cl as the halogen, the activation energy of the solid ion conductor compound decreases to obtain excellent lithium ion conductivity.

For example, the halogen element may include Cl and Br. When the solid ion conductor compound contains Cl and Br as halogen elements, activation energy of the solid ion conductor compound may decrease, and lithium ion conductivity may be further improved by an increase in the ratio of the amorphous phase to the crystalline phase(s) in the compound.

According to an aspect, the solid ion conductor compound may include a crystalline phase and an amorphous phase.

According to an aspect, the crystalline phase may include a first crystalline phase and a second crystalline phase. The first crystalline phase and the second crystalline phase may be the same or may be different from each other. The solid ion conductor compound may further include an amorphous phase between the first crystalline phase and the second crystalline phase.

When the solid ion conductor compound includes a crystalline phase and an amorphous phase, and when the solid ion conductor compound includes an amorphous phase between a first crystalline phase and a second crystalline phase, the conductivity of lithium cations may be improved. While not wanting to be bound by theory, it is understood that excellent lithium ion conductivity is obtained in aligned crystalline phases, however, it has been advantageously discovered that lithium ion conductivity may be further improved by including an amorphous phase in which lithium ions easily move between first and second crystalline phases.

According to an aspect, the crystalline phase may have a layered rock salt crystal structure. For example, the first crystalline phase, the second crystalline phase, or both the first crystalline phase and the second crystalline phase may have a layered rock salt crystal structure.

For example, the layered rock salt crystal structure may include a twisted layered rock salt crystal structure.

According to an aspect, the crystalline phases, for example, the first crystalline phase and the second crystalline phase, may each independently include a C2/m space group or a P3m1 space group. The solid ion conductor compound may have excellent lithium ion conductivity by including the compound having a crystal structure with one or more of these space groups.

According to an aspect, the solid ion conductor compound may have an ionic conductivity of $10^{-4}$ Siemens per centimeter (S/cm) or greater, as measured at room temperature, for example, at 25° C. For example, the solid ion conductor compound may have an ionic conductivity of about $1.1 \times 10^{-4}$ S/cm or greater, about $1.2 \times 10^{-4}$ S/cm or greater, about $1.3 \times 10^{-4}$ S/cm or greater, about $1.4 \times 10^{-4}$ S/cm or greater, about $1.5 \times 10^{-4}$ S/cm or greater, about $1.6 \times 10^{-4}$ S/cm or greater, or about $1.7 \times 10^{-4}$ S/cm or greater, as measured at 25° C. The solid ion conductor compound may have an ionic conductivity of about $10^{-4}$ S/cm to about $5 \times 10^{-4}$ S/cm, or about $1 \times 10^{-4}$ S/cm to about $3 \times 10^{-4}$ S/cm, or about $1.5 \times 10^{-4}$ S/cm to about $2.5 \times 10^{-4}$ S/cm at 25° C., or about $1.6 \times 10^{-4}$ S/cm to about $2.1 \times 10^{-4}$ S/cm, or about $1.7 \times 10^{-4}$ S/cm to about $2.0 \times 10^{-4}$ S/cm. Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989.

According to an aspect, the solid ion conductor compound may be represented by Formula 1:

$$Li_aM_xHo_yX_z \qquad \text{Formula 1}$$

wherein, in Formula 1,

X is a halogen, for example, X is F, Cl, Br, I, or a combination thereof,

M is a metal and is a divalent metal, a trivalent metal, a tetravalent metal, or a combination thereof, and $1 \le a \le 4$, $0 \le x < 1.5$, $0.5 \le y \le 1.5$, and $4 \le z \le 9$ are satisfied.

For example, $1 \le a \le 3.5$, $0 \le x \le 1.5$, $0.5 \le y \le 1.5$, and $4 < z < 9$ may be satisfied. For example, $1 \le a \le 4$, $0 \le x \le 1.5$, $0.75 \le y \le 1.25$, and $4 < z \le 9$ may be satisfied. For example, $1 \le a \le 4$, $0 \le x \le 1.5$, $0.5 \le y \le 1.5$, and $5 \le z \le 8$ may be satisfied.

For example, in the solid ion conductor compound represented by Formula 1, and $2 \le a/y \le 3.5$ or $2.25 \le a/y \le 3.25$ may be satisfied.

The solid ion conductor compound having such a composition may have improved ionic conductivity.

According to an aspect, the solid ion conductor compound may be represented by Formula 2:

$$Li_aM_xHo_yX1_{z1}X2_{z2}$$ Formula 2 wherein, in Formula 2,

X1 is Cl,

X2 is F, Br, I, or a combination thereof,

M is a metal selected from a divalent metal, a trivalent metal, a tetravalent metal, or a combination thereof, and $1 \le a \le 4$, $0 \le x < 1.5$, $0.5 \le y \le 1.5$, $4 \le z1 < 9$, and $0 < z2 \le 5$ are satisfied.

For example, $1 \le a \le 3.5$, $0 < x < 1.5$, $0.5 \le y \le 1.5$, $4 \le z1 < 9$, and $0 < z2 \le 5$ may be satisfied. For example, $1 \le a \le 4$, $0 \le x \le 1.5$, $0.75 \le y \le 1.25$, $4 \le z1 < 9$, and $0 < z2 \le 5$ may be satisfied. For example, $1 \le a \le 4$, $0 \le x \le 1.5$, $0.5 \le y \le 1.5$, $4 \le z1 < 7$, and $0 < z2 \le 3$ may be satisfied. For example, $1 \le a \le 4$, $0 \le x \le 1.5$, $0.5 \le y \le 1.5$, $4 \le z1 < 7$, and $0 < z2 \le 2$ may be satisfied.

For example, in the solid ion conductor compound represented by Formula 2, $0 < z2/(z1+z2) \le 2$, $0 < z2/(z1+z2) \le 1.9$, $0 < z2/(z1+z2) \le 1.8$, or $0 < z2/(z1/z2)1.7$ may be satisfied.

According to an aspect, X2 may be Br.

According to an aspect, M may be Mg, Ca, Ba, Sr, In, Ga, Al, Ln, Ti, Zr, Hf, W, or a combination thereof.

When the solid ion conductor compound includes two or more halogen elements, i.e., heterogeneous halogen elements, the lithium ion conductivity of the solid ion conductor compound may be improved since the solid ion conductor compound includes heterogeneous crystal phases and the ratio of the amorphous phase increases.

According to an aspect, the solid ion conductor compound may be $Li_{3-2x}Mg_xHoCl_6$ ($0 < x < 1.5$), $Li_{3-2x}Ba_xHoCl_6$ ($0 < x < 1.5$), $Li_{3-2x}BaxHoCl_6$ ($0 < x < 1.5$), $Li_{3-2x}Sr_xHoCl_6$ ($0 < x < 1.5$), $Li_{3-3x}In_xHoCl_6$ ($0 < x < 1$), $Li_{3-3x}Ga_xHoCl_6$ ($0 < x < 1$), $Li_{3-3x}Al_xHoCl_6$ ($0 < x < 1$), $Li_{3-3x}Ln_xHoCl_6$ ($0 < x < 1$), $Li_{3-4x}Ti_xHoCl_6$ ($0 < x < 0.75$), $Li_{3-4x}Zr_xHoCl_6$ ($0 < x < 0.75$), $Li_{3-4x}Hf_xHoCl_6$ ($0 < x < 0.75$), $Li_{3-4x}W_xHoCl_6$ ($0 < x < 0.75$), $Li_{3-2x}Mg_xHoCl_5Br$ ($0 < x < 1.5$), $Li_{3-2x}Ca_xHoCl_5Br$ ($0 < x < 1.5$), $Li_{3-2x}Ba_xHoCl_5Br$ ($0 < x < 1.5$), $Li_{3-2x}Sr_xHoCl_5Br$ ($0 < x < 1.5$), $Li_{3-3x}In_xHoCl_5Br$ ($0 < x < 1$), $Li_{3-3x}Ga_xHoCl_5Br$ ($0 < x < 1$), $Li_{3-3x}Al_xHoCl_5Br$ ($0 < x < 1$), $Li_{3-3x}Ln_xHoCl_5Br$ ($0 < x < 1$), $Li_{3-4x}Ti_xHoCl_5Br$ ($0 < x < 0.75$), $Li_{3-4x}Zr_xHoCl_5Br$ ($0 < x < 0.75$), $Li_{3-4x}Hf_xHoCl_5Br$ ($0 < x < 0.75$), $Li_{3-4x}W_xHoCl_5Br$ ($0 < x < 0.75$), $Li_3HoCl_6$, $Li_3HoCl_5Br$, $Li_{2.25}HoCl_{5.25}$, $Li_{3.25}HoCl_{6.25}$, or a combination thereof.

Since the aforementioned solid ion conductor compound essentially includes Ho and a halogen, and has a crystal structure having at a diffraction spectrum including least one diffraction peak at a diffraction angle (2θ) of 40°2θ to 44°2θ, the full width at half maximum (FWHM) of which is about 0.3°2θ or greater, the solid ion conductor compound has improved lithium ion conductivity and excellent chemical stability. Without being limited by theory, it is understood that the lithium ion conductivity and chemical stability of the solid ion conductor compound may be the result of an increase in the lattice volume and an increase in the ratio of the amorphous phase to the crystalline phase(s). In an aspect, the FWHM of the diffraction peak at a diffraction angle of 40°2θ to 44°2θ is about 0.3°2θ or greater, or about 0.5°2θ or greater, or about 0.9°2θ or greater, or is about 0.3°2θ to about 0.99°2θ, or about 0.35°2θ to about 0.98°2θ, or about 0.35°2θ to about 0.96°2θ, when determined by X-ray diffraction using CuKα radiation.

Solid Electrolyte

A solid electrolyte according to another aspect includes the aforementioned solid ion conductor compound. The solid electrolyte may have high ionic conductivity and high chemical stability by including the solid ion conductor compound. The solid electrolyte including the solid ion conductor compound may have improved stability to air and electrochemical stability to lithium metal. Therefore, the solid ion conductor compound may be used as a solid electrolyte for an electrochemical cell.

The solid electrolyte may additionally include a second solid electrolyte in addition to the aforementioned solid ion conductor compound. For example, the second solid electrolyte may be a sulfide-containing (sulfide-based) solid electrolyte, an oxide-containing (oxide-based) solid electrolyte, or a combination thereof. Examples of the second solid electrolyte include, but are not limited to, $Li_2O$—$Al_2O_3$—$TiO_2$—$P_2O_5$ (LATP), a lithium super ionic conductor (LISICON), a lithium phosphorus oxynitride (e.g., LIPON, $Li_{3-y}PO_{4-x}N_x$, wherein $0 < y < 3$, $0 < x < 4$), a thio-LISICON (e.g., $Li_{3.25}Ge_{0.25}P_{0.75}S_4$), $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, or a combination thereof. Any suitable solid electrolyte may be used as the second solid electrolyte.

The solid electrolyte may be in the form of a powder or a molded product. The solid electrolyte in the form of a molded product may be in the form of, for example, a pellet, a sheet, or a thin film, but is not necessarily limited thereto. The solid electrolyte may have various forms depending on the intended use.

Electrochemical Cell

An electrochemical cell according to an aspect includes: a cathode layer including a cathode active material layer; an anode layer including an anode active material layer; and an electrolyte layer between the cathode layer and the anode layer, wherein the cathode active material layer, the electrolyte layer, or a combination of the cathode active material layer and the electrolyte layer includes the aforementioned solid ion conductor compound. When the electrochemical cell includes the solid ion conductor compound, the lithium ion conductivity and chemical stability of the electrochemical cell are improved.

The electrochemical cell may be, for example, an all-solid secondary battery, a liquid electrolyte-containing secondary battery, or a lithium-air battery, but is not limited thereto, and any electrochemical cell including the above-mentioned cathode layer, anode layer, and electrolyte layer may be used.

Hereinafter, an all-solid secondary battery will be described in more detail.

All-Solid Secondary Battery: Type 1

An all-solid secondary battery may include the aforementioned solid ion conductor compound.

The all-solid secondary battery may include: a cathode layer including a cathode active material layer; an anode layer including an anode active material layer; and an electrolyte layer between the cathode layer and the anode layer, wherein the cathode active material layer, the electrolyte layer, or a combination of the cathode active material layer and the electrolyte layer includes the aforementioned solid ion conductor compound.

An all-solid secondary battery according to an aspect may be prepared as follows.

Solid Electrolyte Layer

First, a solid electrolyte layer is prepared.

The solid electrolyte layer may be prepared by mixing the above-described solid ion conductor compound and a binder and then drying the mixture. The solid electrolyte layer may also be prepared by powder rolling the particles of the solid ion conductor compound, for example, the compound represented by Formula 1, having a predetermined particle diameter at a pressure of about 1 ton per square centimeter (tons/cm$^2$) to about 10 tons/cm$^2$, or about 2 tons/cm$^2$ to about 8 tons/cm$^2$, or about 3 tons/cm$^2$ to about 6 tons/cm$^2$. The above-described solid ion conductor compound is used as a solid electrolyte.

The average particle diameter of the solid electrolyte may be, for example, about 0.5 micrometers (μm) to about 20 μm, or about 0.5 μm to about 10 μm, or about 1 μm to about 10 μm. When the solid electrolyte has such an average particle diameter, binding properties are improved in the process of forming a sintered body, so that the ionic conductivity and lifetime characteristics of solid electrolyte particles may be improved.

The thickness of the solid electrolyte layer may be about 10 μm to about 200 μm, or about 20 μm to about 150 μm, or about 20 μm to about 100 μm. When the solid electrolyte layer has such a thickness, sufficient movement speed of lithium ions in the solid electrolyte layer is ensured, and as a result, high ionic conductivity may be obtained.

The solid electrolyte layer may further include a second solid electrolyte such as a sulfide-based (sulfide-containing) solid electrolyte, an oxide-based (oxide-containing) solid electrolyte, or a combination thereof, in addition to the above-described solid ion conductor compound.

The sulfide-based solid electrolyte may include, for example, lithium sulfide, silicon sulfide, phosphorus sulfide, boron sulfide, or a combination thereof. The sulfide-based solid electrolyte may be in the form of particles. The sulfide-based solid electrolyte particles may include Li$_2$S, P$_2$S$_5$, SiS$_2$, GeS$_2$, B$_2$S$_3$, or a combination thereof. The sulfide-based solid electrolyte particles may include Li$_2$S or P$_2$S$_5$. Sulfide-based solid electrolyte particles have greater lithium ion conductivity than other inorganic compounds. For example, the sulfide-based solid electrolyte includes Li$_2$S and P$_2$S$_5$. When the sulfide-based solid electrolyte material includes Li$_2$S—P$_2$S$_5$, the mixing molar ratio of Li$_2$S to P$_2$S$_5$ may be in a range of about 50:50 to about 90:10. Further, as the sulfide-based solid electrolyte, an inorganic solid electrolyte, which is prepared by adding Li$_3$PO$_4$, a halogen, a halogen-containing compound, Li$_{2+2x}$Zn$_{1-x}$GeO$_4$ (LISICON), Li$_{3+y}$PO$_{4-x}$N$_x$ ("LIPON"), Li$_{3.25}$Ge$_{0.25}$P$_{0.75}$S$_4$ (Thio-LISICON), Li$_2$O—Al$_2$O$_3$—TiO$_2$—P$_2$O$_5$ (LATP), or a combination thereof to Li$_2$S—P$_2$S$_5$, SiS$_2$, GeS$_2$, B2S$_3$, or a combination thereof, may be used.

Non-limiting examples of the sulfide-based solid electrolyte may include Li$_2$S—P$_2$S$_5$; Li$_2$S—P$_2$S$_5$LiX (X is a halogen atom); Li$_2$S—P$_2$S$_5$—Li$_2$O; Li$_2$S—P$_2$S$_5$—Li$_2$O—LiI; Li$_2$S—SiS$_2$, Li$_2$S—SiS$_2$-LiI; Li$_2$S—SiS$_2$—LiBr; Li$_2$S—SiS$_2$—LiCl; Li$_2$S—SiS$_2$—B$_2$S$_3$-LiI; Li$_2$S—SiS$_2$—P$_2$S$_5$-LiI; Li$_2$S—B$_2$S$_3$; Li$_2$S—P$_2$S$_5$—Z$_m$S$_n$ (where m and n are independently a positive number, and Z is Ge, Zn, or G); Li$_2$S—GeS$_2$; Li$_2$S—SiS$_2$—Li$_3$PO$_4$; Li$_2$S—SiS$_2$—Li$_p$MO$_q$ (where, p and q are positive numbers, and M is P, Si, Ge, B, Al, Ga, or In), or a combination thereof. In this regard, the sulfide-based solid electrolyte material is prepared by processing a starting material (for example, Li$_2$S or P$_2$S$_5$) of the sulfide-based solid electrolyte by, for example, a melt quenching method or a mechanical milling method. A calcination process may be performed after the processing of the starting material.

Examples of the binder included in the solid electrolyte layer may include, but are not limited to, styrene butadiene rubber (SBR), polytetrafluoroethylene, polyvinylidene fluoride, polyethylene, and polyvinyl alcohol. Any binder may be used as long as it is used in the art. The binder of the solid electrolyte layer may be the same as or different from a binder of a cathode layer and an anode layer.

Cathode Layer

Next, a cathode layer is prepared.

The cathode layer may be prepared by forming a cathode active material layer, including a cathode active material, on a current collector. The average particle diameter of the cathode active material may be, for example, about 2 μm to about 10 μm, or about 2 μm to about 8 μm, or about 4 μm to about 6 μm.

Any cathode active material may be used without limitation as long as it is suitable for use in the field of secondary batteries. For example, the cathode active material may be a lithium transition metal oxide or a transition metal sulfide. For example, it is possible to use at least one of a composite oxide of lithium or a metal such as cobalt, manganese, nickel, or a combination thereof. Specifically, the cathode active material may be a compound represented by any of Formulas: Li$_a$A$_{1-b}$B$^1_b$D$^1_2$ (where, 0.90≤a≤1.8, and 0≤b≤0.5); Li$_a$E$_{1-b}$B$^1_b$O$_{2-c}$D$^1_c$ (where, 0.90≤a≤1.8, 0≤b≤0.5, and 0≤c≤0.05); LiE$_{2-b}$B$^1_b$O$_{4-c}$D$^1_c$ (where, 0≤b≤0.5, and 0≤c≤0.05); Li$_a$Ni$_{1-b-c}$Co$_b$B$^1_c$D$^1_α$ (where, 0.90≤a≤1.8, 0≤b≤0.5, 0≤c≤0.05, and 0<α≤2); Li$_a$Ni$_{1-b-c}$Co$_b$B$^1_c$O$_{2-α}$F$^1_α$ (where, 0.90≤a≤1.8, 0≤b≤0.5, 0≤c≤0.05, and 0<α<2); Li$_a$Ni$_{1-b-c}$Co$_b$B$^1_c$O$_{2-α}$F$^1_α$ (where, 0.90≤a≤1.8, 0≤b≤0.5, 0≤c≤0.05, and 0<α<2); Li$_a$Ni$_{1-b-c}$Mn$_b$B$^1_c$D$^1_α$ (where, 0.90≤a≤1.8, 0≤b≤0.5, 0≤c≤0.05, and 0<α≤2); Li$_a$Ni$_{1-b-c}$Mn$_b$B$^1_c$O$_{2-α}$F$^1_α$ (where, 0.90≤a≤1.8, 0≤b≤0.5, 0≤c≤0.05, and 0<α<2); Li$_a$Ni$_{1-b-c}$Mn$_b$B$^1_c$O$_{2-α}$F$^1_2$ (where, 0.90≤a≤1.8, 0≤b≤0.5, 0≤c≤0.05, and 0<α<2); Li$_a$Ni$_b$E$_c$G$_d$O$_2$ (where, 0.90≤a≤1.8, 0≤b≤0.9, 0≤c≤0.5, 0.001≤d≤0.1); Li$_a$Ni$_b$Co$_c$Mn$_d$GeO$_2$ (where, 0.90≤a≤1.8, 0≤b≤0.9, 0≤c≤0.5, 0≤d≤0.5, and 0.001≤e≤0.1); Li$_a$NiG$_b$O$_2$ (where, 0.90≤a≤1.8, and 0.001≤b≤0.1); Li$_a$CoG$_b$O$_2$ (where, 0.90≤a≤1.8, and 0.001≤b≤0.1); Li$_a$MnG$_b$O$_2$ (where, 0.90≤a≤1.8, 0.001≤b≤0.1); Li$_a$Mn$_2$G$_b$O$_4$ (where, 0.90≤a≤1.8, and 0.001≤b≤0.1); QO$_2$, QS$_2$; LiQS$_2$; V$_2$O$_5$, LiV$_2$O$_5$; LiIO2; Li$_{(3-f)}$J$_2$(PO$_4$)$_3$ (where 0≤f≤2); Li$_{(3-f)}$Fe$_2$(PO$_4$)$_3$ (where 0≤f≤2); and LiFePO$_4$. In Formulas, A is Ni, Co, Mn, or a combination thereof; B$^1$ is Al, Ni, Co, Mn, Cr, Fe, Mg, Sr, V, a rare earth element, or a combination thereof; D$^1$ is O, F, S, P, or a combination thereof; E is Co, Mn, or a combination thereof; F$^1$ is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. Examples of the compound include LiCoO$_2$, LiMn$_x$O$_{2x}$ (where x is 1 or 2), LiNi$_{1-x}$Mn$_x$O$_{2x}$ (where 0<x<1), Ni$_{1-x-y}$Co$_x$Mn$_y$O$_2$ (where 0≤x≤0.5, 0≤y≤0.5), Ni$_{1-x-y}$Co$_x$Al$_y$O$_2$ (where 0≤x≤0.5, 0≤y≤0.5), LiFePO$_4$, TiS$_2$, FeS$_2$, TiS$_3$, and FeS$_3$. A combination comprising at least one of the foregoing cathode active materials may be used.

A cathode active material compound having a coating layer applied on a surface thereof may also be used. A mixture of the aforementioned cathode active material compound and a cathode active material compound having a coating layer thereon may also be used. The coating layer applied to the surface of such a cathode active material compound includes, for example, an oxide of a coating element, a hydroxide of a coating element, an oxyhydroxide of a coating element, an oxycarbonate of a coating element, or a hydroxycarbonate of a coating element. The cathode active material compound constituting the coating layer is amorphous or crystalline. The coating element included in the coating layer is Mg, Al, Co, K, Na, Ca, Si, Ti, V, Sn, Ge, Ga, B, As, Zr, or a combination thereof. The method of forming the coating layer is not limited as long as it does not adversely affect the physical properties of the cathode active material. The coating method is, for example, spray coating, dipping method, or the like. Such coating methods are known to those of skill in the art, and so a detailed description thereof is omitted herein.

The cathode active material includes, for example, a lithium salt of a transition metal oxide having a layered rock salt type structure, from among the above-described lithium transition metal oxides. A "layered rock salt type structure" refers to a structure in which oxygen atom layers and metal atom layers are alternately and regularly arranged in a <111> crystallographic direction, with each of the atom layers forming a two-dimensional (2D) plane. A "cubic rock salt-type structure" refers to a sodium chloride (NaCl)-type structure, and in particular, a structure in which face centered cubic lattices (FCCs) formed by respective cations and anions, are disposed in a way that ridges of the unit lattice are offset by one-half. The lithium transition metal oxide having a layered rock salt type structure may be, for example, a ternary lithium transition metal oxide such as $LiNi_xCo_yAl_zO_2$ (NCA) or $LiNi_xCo_yMn_xO_2$ (NCM), where $0<x<1$, $0<y<1$, $0<z<1$, $x+y+z=1$. When the cathode active material includes a ternary lithium transition metal oxide having a layered rock salt type structure, the energy density and thermal stability of the all-solid secondary battery are further improved.

As described above, the cathode active material may include a coating layer on a surface thereof. Any coating layer suitable for the cathode active material of an all-solid secondary battery may be used. The coating layer includes, for example, $Li_2O$—$ZrO_2$ (LZO).

When the cathode active material contains nickel (Ni) as a ternary lithium transition metal oxide, for example, nickel cobalt aluminum (NCA) or nickel cobalt manganese (NCM), the capacity density of an all-solid secondary battery may increase thereby enabling reduction in metal elution from the cathode active material in a charged state. As a result, the cycle characteristics of the all-solid secondary battery in the charged state are improved.

The cathode active material may be a particle having, for example, a sphere shape or an ellipse shape. The average particle diameter of the cathode active material is not particularly limited, and may be within a range applicable to the cathode active material of an all-solid secondary battery. The content of the cathode active material in the cathode layer is also not particularly limited, and is within a range applicable to the cathode layer of an all-solid secondary battery. The content of the cathode active material in the cathode active material layer may be, for example, about 50 weight percent (wt %) to about 95 wt %, or about 60 wt % to about 90 wt %, or about 60 wt % to about 80 wt %.

The cathode active material layer may further include the above-described solid ion conductor compound. For example, both the cathode active material layer and the solid electrolyte layer may include the solid ion conductor compound. For example, when the cathode active material layer includes the solid ion conductor compound, the solid electrolyte layer may not include the solid ion conductor compound.

The cathode active material layer may further include a binder. The binder may be, for example, styrene butadiene rubber (SBR), polytetrafluoroethylene, polyvinylidene fluoride, polyethylene, or a combination thereof.

The cathode active material layer may include a conductive material. The conductive material may be, for example, a graphite, a carbon black, an acetylene black, Ketjen black, a carbon fiber, a metal powder, or a combination thereof.

The cathode active material layer may further include an additive such as a filler, a coating agent, a dispersant, an ion-conductive auxiliary agent, or a combination thereof, in addition to the positive electrode active material, the solid ion conductor compound, the binder, and conductive material.

The additives such as the filler, the coating agent, the dispersant, and/or the ion conductive auxiliary agent, that may be included in the cathode active material layer, are not particularly limited and may be any material suitable for an electrode of an all-solid secondary battery.

The cathode may further include a cathode current collector. The cathode current collector may be, for example, a metal substrate such as a plate or foil. The metal of the metal substrate may include aluminum (Al), indium (In), copper (Cu), magnesium (Mg), stainless steel, titanium (Ti), iron (Fe), cobalt (Co), nickel (Ni), zinc (Zn), germanium (Ge), lithium (Li), an alloy thereof, or a combination thereof. The cathode current collector may be omitted.

The cathode current collector may further include a carbon layer disposed on one or both surfaces of the metal substrate. When the carbon layer is additionally disposed on the metal substrate, it is possible to prevent the metal of the metal substrate from being corroded by the solid ion conductor compound included in the cathode layer and to reduce the interfacial resistance between the cathode active material layer and the cathode current collector. The thickness of the carbon layer may be, for example, about 1 μm to 5 μm. When the carbon layer is too thin, it may be difficult to completely block contact between the metal substrate and the solid electrolyte. When the carbon layer is too thick, the energy density of the all-solid secondary battery may decrease. The carbon layer may include amorphous carbon, crystalline carbon, or a combination thereof.

Anode Layer

Next, an anode layer is prepared.

The anode layer is prepared in substantially the same manner as the cathode layer except that an anode active material is used instead of the cathode active material. The anode layer may be prepared by forming an anode active material layer including an anode active material on an anode current collector.

The anode active material layer may additionally include the above-described solid ion conductor compound.

The anode active material may be a lithium metal, a lithium metal alloy, or a combination thereof.

The anode active material layer may further include an anode active material in addition to a lithium metal, a lithium metal alloy, or a combination thereof. The negative electrode active material may include, for example, a metal alloyable with lithium, a transition metal oxide, a non-transition metal oxide, a carbon-based material, or a combination thereof. The metal alloyable with lithium may be, for example, Ag, Si, Sn, Al, Ge, Pb, Bi, Sb, a Si—Y' alloy (where Y' is an alkali metal, an alkaline earth metal, a group 13 element, a group 14 element, a transition metal, a rare earth element, or a combination element thereof, but is not Si), a Sn—Y' alloy (where Y' is an alkali metal, an alkaline earth metal, group 13 element, a group 14 element, a transition metal, a rare earth element, or a combination element thereof, but is not Sn), or a combination thereof. In the Si—Y' alloy and the Sn—Y', Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be, for example, a lithium titanium oxide, a vanadium oxide, a lithium vanadium oxide, or a combination thereof. The non-transition metal oxide may be, for example, $SnO_2$, SiOx (where 0<x<2), or a combination thereof. The carbon-based (carbon-containing) material may be, for example, crystalline carbon, amorphous carbon, or a combination thereof. The crystalline carbon may be graphite, such as amorphous graphite, plate-shaped graphite, flake-shaped graphite, spherical graphite, fibrous natural graphite, artificial graphite, or a combination thereof. The amorphous carbon may be a soft carbon (low-temperature calcined carbon), a hard carbon, a mesophase pitch carbide, a calcined coke, or a combination thereof.

Figure 6:
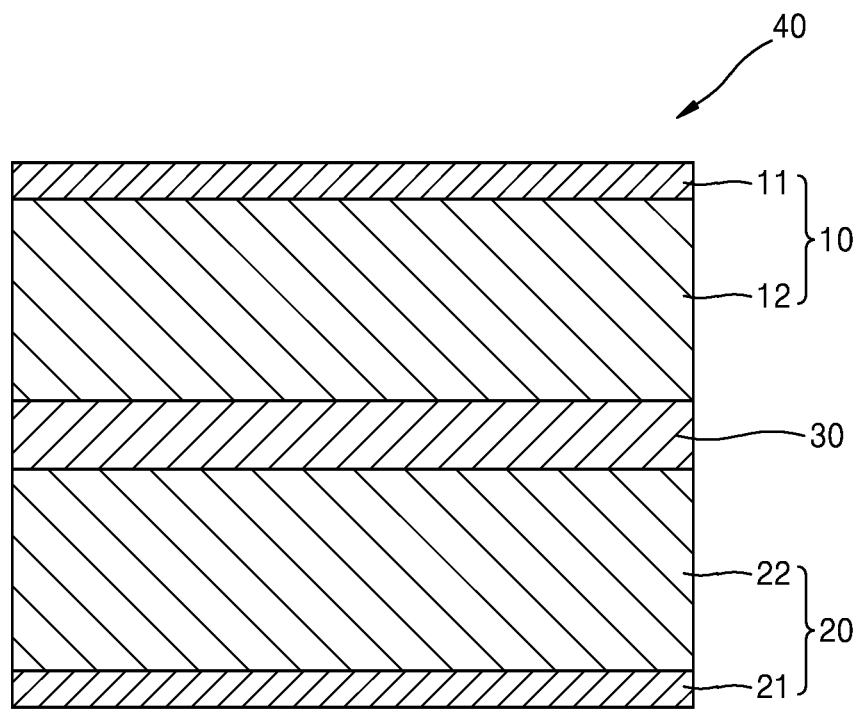
FIG. 6 is a cross-sectional schematic view of an all-solid secondary battery according to an aspect.

Referring to FIG. 6, an all-solid secondary battery 40 according to an aspect includes a solid electrolyte layer 30, a cathode layer 10 disposed on a surface of the solid electrolyte layer 30, and an anode layer 20 disposed on the other surface of the solid electrolyte layer 30. The cathode layer 10 includes a cathode active material layer 12 contacting the solid electrolyte layer 30 and a cathode current collector 11 contacting the cathode active material layer 12. The anode layer 20 includes an anode active material layer 22 contacting the solid electrolyte layer 30 and an anode current collector 21 contacting the anode active material layer 22.

The all-solid secondary battery 40 is formed by disposing the cathode active material layer 12 and the anode active material layer 22 on opposite surfaces of the solid electrolyte layer 30 and respectively forming the cathode current collector 11 and the anode current collector 21 on the cathode active material layer 12 and the anode active material layer 22. Alternatively, the all-solid secondary battery 40 is formed by sequentially stacking the anode active material layer 22, the solid electrolyte layer 30, the cathode active material layer 12, and the cathode current collector 11 on the anode current collector 21.

All solid secondary battery: Type 2

Figure 7:
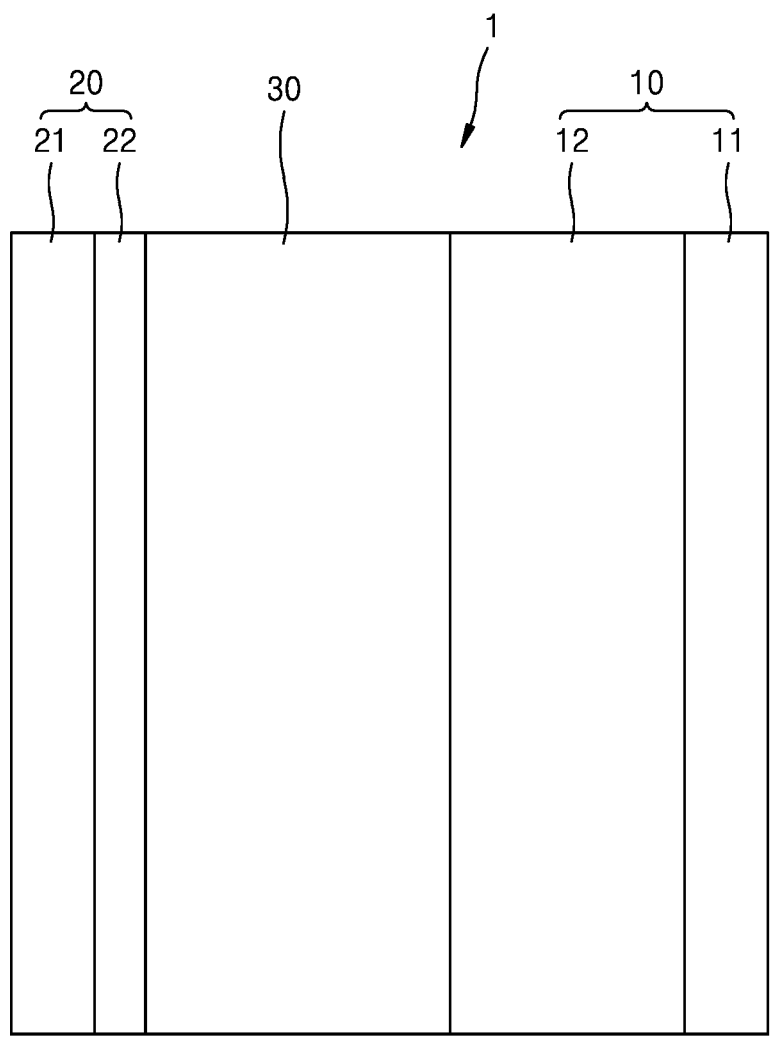
FIG. 7 is a schematic view of an all-solid secondary battery according to another aspect.
Figure 8:
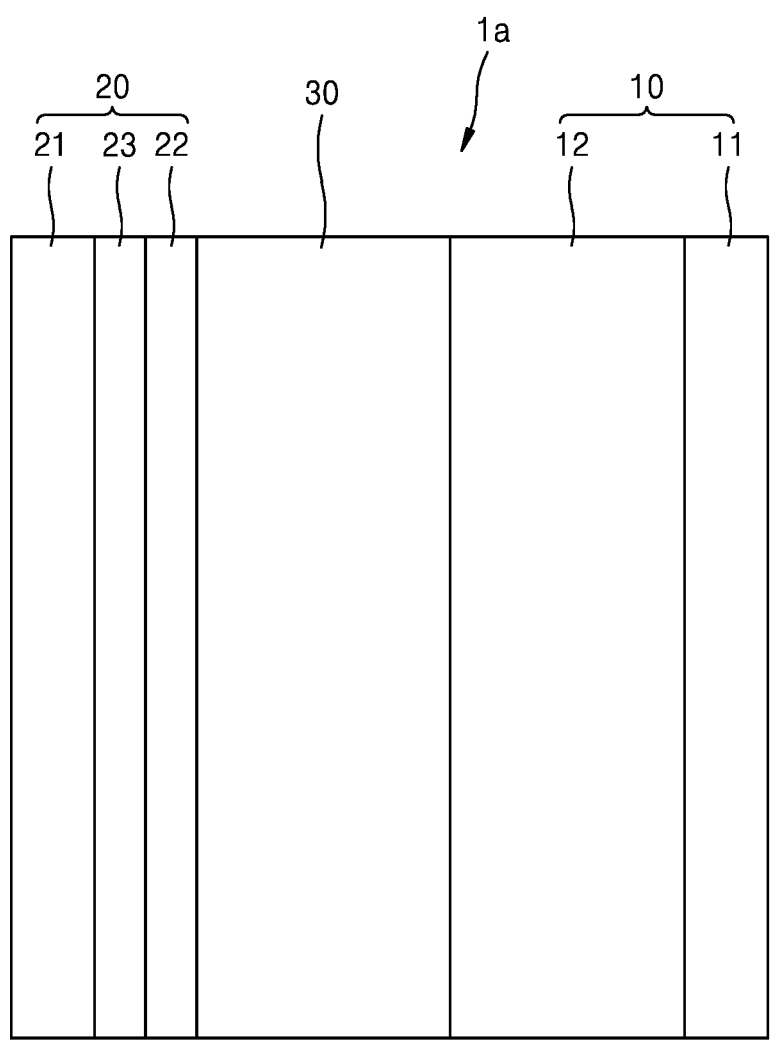
FIG. 8 is a schematic view of an all-solid secondary battery according to another aspect.

Referring to FIGS. 7 to 8, an all-solid secondary battery 1 includes: a cathode layer 10 including a cathode active material layer 12 disposed on a cathode current collector 11; an anode layer 20 including an anode active material layer 22 disposed on an anode current collector 21; and an electrolyte layer 30 disposed between the cathode layer 10 and the anode layer 20, wherein the cathode active material layer 12, the electrolyte layer 30, or a combination of both the cathode active material layer and the electrolyte layer includes the above-described solid ion conductor compound.

An all-solid secondary battery according to another aspect (Type 2) may be prepared as follows.

A cathode electrode layer and a solid electrolyte layer are prepared in the same manner as in the above-described all-solid secondary battery (Type 1).

Anode Layer

Next, an anode layer is prepared.

Referring to FIGS. 7 to 8, an anode layer 20 includes an anode current collector 21 and an anode active material layer 22 on the anode current collector 21. The anode active material layer 22 includes, for example, an anode active material and a binder.

An anode active material included in the anode active material layer 22 is, for example, a particle. The average particle diameter of the anode active material is, for example, about 4 μm or less, about 3 μm or less, about 2 μm or less, about 1 μm or less, or about 900 nanometers (nm0 or less. The average particle diameter of the anode active material having a particle shape is, for example, about 10 μm to about 4 μm, about 10 μm to about 3 μm, about 10 nm to about 2 μm, about 10 nm to about 1 μm, or about 10 nm to about 900 nm. When the anode active material has an average particle diameter within the above range, it may be easier to reversibly incorporate and/or deincorporate lithium during charge and discharge. The average particle diameter of the anode active material is, for example, measured using a laser particle size distribution meter (e.g., particle size analyzer).

The anode active material included in the anode active material layer 22 includes, for example, a carbon-based anode active material, a metal negative electrode active material, or a combination thereof. As used herein, the term "metal" refers to metal or metalloid elements as defined in the Periodic Table of Elements selected from Groups 1 to 17, including the lanthanide elements and the actinide elements. "Metalloid" means B, Si, Ge, As, Sb, Te, and a combination thereof.

The carbon-based anode active material is, for example, an amorphous carbon. Examples of amorphous carbon include, but are not limited to, carbon black (CB), acetylene black (AB), furnace black (FB), ketjen black (KB), and graphene. Any amorphous carbon suitable for use as a carbon-based anode active material may be used. Amorphous carbon has no crystallinity or only very low crystallinity, and is distinguished from crystalline carbon or graphite-based carbon.

The metal anode active material includes gold (Au), platinum (Pt), palladium (Pd), silicon (Si), silver (Ag), aluminum (Al), bismuth (Bi), tin (Sn), zinc (Zn), or a combination thereof, but is not limited thereto. Any metal anode material may be used as long as it is capable of forming an alloy or compound with lithium. For example, since nickel (Ni) does not form an alloy with lithium, it is not suitable for use as a metal anode active material.

The anode active material layer 22 includes a single type of anode active material from among the above-mentioned anode active materials, or includes a mixture of a plurality of different anode active materials. For example, the anode active material layer 22 may include only amorphous carbon, or may include amorphous carbon and at least one metal of gold (Au), platinum (Pt), palladium (Pd), silicon (Si), silver (Ag), aluminum (Al), bismuth (Bi)), tin (Sn), and zinc (Zn). Alternatively, the anode active material layer 22 includes a mixture of amorphous carbon and at least one selected from gold (Au), platinum (Pt), palladium (Pd), silicon (Si), silver (Ag), aluminum (Al), bismuth (Bi), tin (Sn), or zinc (Zn). The mixing ratio of a mixture of amorphous carbon and metal (e.g., gold) by weight is, for example, about 10:1 to about 1:2, about 5:1 to about 1:1, or about 4:1 to about 2:1, but is not necessarily limited to this range. The mixing ratio of amorphous carbon to metal is selected according to the desired characteristics of the all-solid secondary battery 1. When the negative electrode active material has such a composition, the cycle characteristics of the all-solid secondary battery 1 are further improved.

The anode active material in the anode active material layer 22 includes, for example, a mixture of first particles of amorphous carbon and second particles of a metal. The metal includes, for example, gold (Au), platinum (Pt), palladium (Pd), silicon (Si), silver (Ag), aluminum (Al), bismuth (Bi), tin (Sn), zinc (Zn), or a combination thereof. When the metal is a metalloid (e.g., B, Si, Ge, As, Sb, Te), the metal is a semiconductor. The content of the second particles is about 8 wt % to about 60 wt %, about 10 wt % to about 50 wt %, about 15 wt % to about 40 wt %, or about 20 wt % to about 30 wt %, based on the total weight of the anode active material. When the content of the second particles is within the above range, for example, the cycle characteristics of the all-solid secondary battery 1 are further improved.

Examples of the binder included in the anode active material layer 22 may include, but are not limited to, styrene-butadiene rubber (SBR), polytetrafluoroethylene, polyvinylidene fluoride, polyethylene, a vinylidene fluoride/hexafluoropropylene copolymer, polyacrylonitrile, polymethyl methacrylate, or a combination thereof. Any binder suitable for the anode active material layer may be used. The binder may be a single binder or a plurality of different binders.

When the anode active material layer 22 includes the binder, the anode active material layer 22 is stabilized on the anode current collector 21. Further, the formation of a crack(s) in the anode active material layer 22 is suppressed despite a change in volume and/or a change in relative position of the anode active material layer 22 during the charge and discharge process. For example, when the anode active material layer 22 does not include the binder, the anode active material layer 22 may be easily separated from the anode current collector 21. For example, detachment of a portion of the anode active material layer 22 from the anode current collector 21 may occur when the anode current collector 21 comes into contact with the solid electrolyte layer 30, and increases the possibility of occurrence of a short circuit.

The anode active material layer 22 is prepared by, for example, applying a slurry including the anode active material onto the anode current collector 21 and drying the applied slurry. When the binder is included, the anode active material may be stably dispersed in the slurry. For example, when the slurry is applied onto the anode current collector 21 by a screen printing method, it is possible to suppress the clogging of a screen (for example, clogging by aggregates of the anode active material).

The anode active material layer 22 may further include additives used in the all-solid secondary battery 1, for example, a filler, a coating agent, a dispersant, and an ion conductive auxiliary agent.

The thickness of the anode active material layer 22 is, for example, about 50% or less, about 40% or less, about 30% or less, about 20% or less, about 10% or less, or about 5% or less of the thickness of the cathode active material layer 12. The thickness of the anode active material layer 22 is, for example, about 1 μm to about 20 μm, about 2 μm to about 10 μm, or about 3 μm to about 7 μm. When the anode active material layer 22 is too thin, lithium dendrites formed between the anode active material layer 22 and the anode current collector 21 collapse the anode active material layer 22, making it difficult to improve the cycle characteristics of the all-solid secondary battery 1. When the anode active material layer 22 is too thick, the energy density of the all-solid secondary battery 1 decreases, and the internal resistance of the all-solid secondary battery 1 increases due to the anode active material layer 22, so that it is difficult to improve the cycle characteristics of the all-solid secondary battery 1.

As the thickness of the anode active material layer 22 decreases, the charging capacity of the anode active material layer 22 also decreases. The charging capacity of the anode active material layer 22 is, for example, about 50% or less, about 40% or less, about 30% or less, about 20% or less, about 10% or less, about 5% or less, or about 2% or less of the charging capacity of the cathode active material layer 12. The charging capacity of the anode active material layer 22 is, for example, about 0.1% to about 50%, about 0.1% to about 40%, about 0.1% to about 30%, about 0.1% to about 20%, about 0.1% to about 10%, about 0.1% to about 5%, or about 0.1% to about 2% of the charging capacity of the cathode active material layer 1. When the charging capacity of the anode active material layer 22 is too small, the anode active material layer 22 becomes very thin, and as a result, lithium dendrites formed between the anode active material layer 22 and the anode current collector 21 collapse the anode active material layer 22, and thus it is difficult to improve the cycle characteristics of the all-solid secondary battery 1. When the charging capacity of the anode active material layer 22 is too large, the energy density of the all-solid secondary battery 1 decreases, and the internal resistance of the all-solid secondary battery 1 affected by the negative electrode active material layer 22 increases, so that it is difficult to improve the cycle characteristics of the all-solid secondary battery 1.

The charging capacity of the cathode active material layer 12 is obtained by multiplying the charging capacity density (measured as milliampere hours per gram, mAh/g) of the cathode active material by the mass of the cathode active material in the cathode active material layer 12. When several types of cathode active materials are used, the charging capacity value is calculated for each of the respective individual cathode active materials, and the sum of these values is the total charging capacity of the cathode active material layer 12. The charging capacity of the anode active material layer 22 is also calculated using the same method. That is, the charging capacity of the anode active material layer 22 is obtained by multiplying the charging capacity density (mAh/g) of the anode active material by the mass of the anode active material in the anode active material layer 22. When several types of anode active materials are used, the charging capacity value is calculated for each of the respective anode active materials, and the sum of these values is the total charging capacity of the anode active material layer 22. Here, each of the charging capacity density of the cathode active material and the charging capacity density of the anode active material is measured using an all-solid half-cell, with lithium metal as a counter electrode. The charging capacity of the cathode active material layer 12 and the charging capacity of the anode active material layer 22 are each directly determined by measuring the charging capacity using an all-solid half-cell. When the measured charging capacity is divided by the mass of each active material, the charging capacity density is obtained. Alternatively, each of the charging capacity of the cathode active material layer 12 and the charging capacity of the anode active material layer 22 may be an initial charging capacity measured during a first charge cycle.

Referring to FIG. 8, an all-solid secondary battery 1a may further include, for example, a metal layer 23 disposed between the anode current collector 21 and the anode active material layer 22. The metal layer 23 contains lithium, a lithium alloy, or a combination thereof. The metal layer 23 acts as a lithium reservoir. Examples of the lithium alloy may include, but are not limited to, a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof. Any lithium alloy may be used as long as it is suitable for an all-solid secondary battery. The metal layer 23 may include a single alloy or lithium, or may include of several different types of alloys.

The thickness of the metal layer 23 is not particularly limited, but is, for example, about 1 µm to about 1,000 µm, about 1 µm to about 500 µm, about 1 µm to about 200 µm, about 1 µm to about 150 µm, about 1 µm to about 100 µm, or about 1 µm to about 50 µm. When the metal layer 23 is too thin, its ability to serve as a lithium reservoir is diminished. When the metal layer 23 is too thick, there is a possibility that the mass and volume of the all-solid secondary battery 1 increases, and the cycle characteristics deteriorate. The metal layer 23 may be, for example, a metal foil having a thickness in the above-described ranges.

In the all-solid secondary battery 1a, the metal layer 23 is disposed between the anode current collector 21 and the anode active material layer 22 prior to (or during) assembly of the all-solid secondary battery 1, or is deposited between the anode current collector 21 and the anode active material layer 22 during charge of the all-solid secondary battery 1 after assembly. When the metal layer 23 is disposed between the anode current collector 21 and the anode active material layer 22 prior to assembly of the all-solid secondary battery 1, the metal layer acts as a lithium reservoir because it contains lithium. For example, a lithium foil is disposed between the anode current collector 21 and the anode active material layer 22 before assembling the all-solid secondary battery 1a. Accordingly, the cycle characteristics of the all-solid secondary battery 1a including the metal layer 23 are further improved. When the metal layer 23 is deposited during charge after assembly of the all-solid secondary battery 1a, that is, the metal layer 23 is not included when assembling the all-solid secondary battery 1a, the energy density of the all-solid secondary battery 1a increases. For example, when the all-solid secondary battery 1 is charged, it is charged in excess of the charging capacity of the negative electrode active material layer 22. That is, the anode active material layer 22 is overcharged. At the initial stage of charging, lithium ions are transferred from the cathode layer and absorbed in the anode active material layer 22. The anode active material included in the anode active material layer 22 forms an alloy or a compound with the lithium ions transferred from the cathode layer 10. When the all-solid secondary battery 1 is charged in excess of the capacity of the negative electrode active material layer 22, for example, lithium is deposited on the rear surface of the anode active material layer 22, that is, between the anode current collector 21 and the anode active material layer 22, and a lithium metal layer corresponding to the metal layer 23 is formed by the deposited lithium. The metal layer 23 is a metal layer mainly including lithium (that is, metallic lithium). This result is obtained, for example, when the anode active material included in the anode active material layer 22 is composed of a material capable of forming an alloy or a compound with lithium. During discharge, the lithium in the anode active material layer 22 and in the metal layer 23, is ionized and moves toward the cathode layer 10. Therefore, lithium may be used as an anode active material in the all-solid secondary battery 1a. Further, since the anode active material layer 22 covers the metal layer 23, it serves as a protective layer for the metal layer 23 and suppresses the precipitation and growth of lithium dendrites. Accordingly, short-circuiting and capacity reduction of the all-solid secondary battery 1a are suppressed, and as a result, the cycle characteristics of the all-solid secondary battery 1a are improved. In addition, when the metal layer 23 is disposed during charge and after assembly of the all-solid secondary battery 1a, the anode current collector 21, the anode active material layer 22, and a region therebetween are Li-free regions, which do not contain lithium (Li) in the initial state of the all-solid secondary battery 1a (i.e., prior to the initial charge) or in the state after discharge.

The anode current collector 21 is composed, for example, of a material that does not react with lithium, that is, a material that does not form either an alloy or a compound with lithium. Examples of the material constituting the anode current collector 21 include, but are not limited to, copper (Cu), stainless steel, titanium (Ti), iron (Fe), cobalt (Co), nickel (Ni), or a combination thereof. Any material suitable for use as a current collector and which does not form an alloy or a compound with lithium, may be used. The negative electrode current collector 21 may be composed of one of the above-described metals, or may be an alloy or compound of two or more of the metals, and the metal, alloy, and/or compound may be coated with a coating material or may be uncoated. The anode current collector 21 has, for example, a plate shape or a foil shape.

The all-solid secondary battery 1 may further include, for example, a thin film (not shown) including an element capable of forming an alloy with lithium on the anode current collector 21. The thin film is disposed between the anode current collector 21 and the anode active material layer 22. The thin film contains, for example, an element capable of forming an alloy with lithium. Examples of the element capable of forming an alloy with lithium may include, but are not limited to, gold, silver, zinc, tin, indium, silicon, aluminum, bismuth, or a combination thereof. Any element may be used as long as it is capable of forming an alloy or compound with lithium. The thin film is formed of one of these metals, or an alloy of two or more types of metals. When the thin film is disposed on the anode current collector 21, for example, the deposition pattern of the metal layer 23 deposited between the thin film 24 and the anode active material layer 22 is further flattened, and the cycle characteristics of the all-solid secondary battery 1 may be further improved.

The thickness of the thin film is, for example, about 1 nm to about 800 nm, about 10 nm to about 700 nm, about 50 nm to about 600 nm, or about 100 nm to about 500 nm. When the thickness of the thin film is less than 1 nm, it may be difficult for the thin film to function as intended. When the thin film is too thick, the thin film itself absorbs lithium, thereby reducing the deposition amount of lithium at the anode, decreasing the energy density of the all-solid-state battery, and deteriorating the cycle characteristics of the all-solid secondary battery 1. The thin film may be disposed on the anode current collector 21 by, for example, a vacuum deposition method, a sputtering method, or a plating method, but the method is not necessarily limited thereto. Any method capable of effectively forming a thin film may be used.

A method of preparing a solid ion conductor compound according to an aspect includes the steps of: providing a mixture including a lithium precursor and a holmium precursor; and reacting the mixture in a solid phase to obtain a solid ion conductor compound. The solid ion conductor compound is the above-described solid ion conductor compound. The providing of the mixture may include mixing the lithium precursor and the holmium precursor to prepare the mixture.

The lithium precursor may include a lithium halide. For example, the lithium halide may include LiF, LiCl, LiBr, LiI, or a combination thereof. For example, the lithium halide may include LiCl, LiBr, or a combination thereof.

The holmium precursor may include a holmium halide. For example, the holmium halide may include $HoF_3$, HoCl3, HoBr₃, HoI₃, or a combination thereof. For example, the holmium halide may include HoCl₃, HoBr₃, or a combination thereof.

According to an aspect, the lithium halide and the holmium halide may be mixed in a stoichiometric ratio of about 2:1 to about 4:1. For example, the stoichiometric ratio of the lithium halide and the holmium halide may be about 2.1:1 to about 3.9:1, about 2.2:1 to about 3.8:1, about 2:1 to about 3.9:1, about 2:1 to about 3.8:1, about 2:1 to about 3.7:1, about 2:1 to about 3.6:1, about 2:1 to about 3.5:1, about 2:1 to about 3.4:1, or about 2:1 to about 3.3:1, but is not limited thereto. Any stoichiometric ratio may be applied as long as it is capable of providing a compound having a diffraction peak at a diffraction angle (2θ) of 40°2θ to 44°2θ when measured by XRD using CuKα radiation, and which has a full width at half maximum (FWHM) of 0.3°2θ or more.

According to an aspect, the reacting of the mixture in the solid phase to obtain the solid ion conductor includes ball-mill-mixing the dried mixture. The ball-mill-mixing may be performed at 700 rotations per minute (rpm) for 24 hours in an inert atmosphere. The method may further include drying the mixture prior to the ball-mill-mixing.

According to an aspect, the ball-mill-mixing includes a cycle alternating between a first time interval and a second time interval. The first time interval includes the ball-mill-mixing and the second time interval comprises a rest period. Here, the first time interval and the second time interval may be the same or different. For example, the first time interval may be twice as long as the second time interval. As such, when the rest period (second time interval) is provided during the ball-mill mixing process, the solid ion conductor compound may be obtained as a mixture of crystalline and amorphous phases. The cycle alternating between the first time interval and the second time interval is repeated for a time period of about 20 hours to about 30 hours, or from about 22 hours to about 26 hours, or from about 23 hours to about 25 hours, or for about 24 hours.

According to an aspect, the method of preparing the solid ion conductor compound is performed at room temperature, and does not include a calcination step for crystallization. For example, the method of preparing the solid ion conductor compound is performed at about 20° C. to about 25° C., or at about 22° C. to about 25° C., or at room temperature (about 25° C.).

In a method of preparing a solid ion conductor compound, the method includes the steps of mixing raw (precursor) materials to form a mixture, heat-treating the mixture, and crystallizing the heat-treated mixture. The method of preparing a solid ion conductor compound according to an aspect of the present disclosure does not include an additional crystallization step after the reacting/mixing step in a solid phase. Therefore, it is possible to obtain a solid ion conductor compound having both a crystalline phase including Ho and an amorphous phase, having an XRD spectrum including at least one diffraction peak at a diffraction angle (2θ) of 40°2θ to 44°2θ when measured using CuKα radiation, and having a crystal structure in which a full width at half maximum (FWHM) of the at least one diffraction peak at a diffraction angle of 40°2θ to 44°2θ is about 0.3° or greater.

The inert atmosphere is an atmosphere containing an inert gas. Examples of the inert gas may include, but are not limited to, nitrogen and argon. Any suitable inert gas may be used.

This present disclosure will be described in more detail through the following examples and comparative examples. However, the scope of the present disclosure is not limited thereto.

EXAMPLES (Preparation of Solid Ion Conductor Compound)

Example 1

LiCl as a lithium precursor, and HoCl₃ as a holmium precursor were put into a planetary ball mill at a stoichiometric ratio of 3:1 in a glove box and in an Ar atmosphere, zirconia (YSZ) balls were added, the resulting materials were pulverized and mixed for 10 minutes at 700 rpm under an Ar atmosphere followed by a 5 minute rest period (no mixing). A cycle having a 10 minute mixing period and a 5-minute rest period was repeated for 24 hours, so as to obtain a solid ion conductor compound having the composition given in Table 1 below. Subsequently, for XRD analysis, the obtained solid ion conductor compound was pressed with a uniaxial pressure of 350 megapascals (MPa) to prepare a pellet having a thickness of about 10 millimeters (mm) and a diameter of about 13 mm.

Example 2

A solid ion conductor compound having the composition given in Table 1 below was obtained in the same manner as in Example 1, except that the stoichiometric ratio of the lithium precursor and the holmium precursor was changed to 2.25:1. The obtained solid ion conductor compound was molded to prepare a pellet.

Example 3

A solid ion conductor compound having the composition given in Table 1 below was obtained in the same manner as in Example 1, except that the stoichiometric ratio of the lithium precursor and the holmium precursor was changed to 3.25:1. The obtained solid ion conductor compound was molded to prepare a pellet.

Example 4

A solid ion conductor compound having the composition given in Table 1 below was obtained in the same manner as in Example 1, except that two types of lithium precursors were used, and the stoichiometric ratio of the lithium precursor and the holmium precursor was changed to 2:1:1. The obtained solid ion conductor compound was molded to prepare a pellet.

Comparative Example 1

LiCl as a lithium precursor, and HoCl₃ as a holmium precursor were put into a planetary ball mill at a stoichiometric ratio of 3:1 in a glove box and in an Ar atmosphere, zirconia (YSZ) balls were added, the resulting materials were pulverized and mixed for 10 minutes at 700 rpm under an Ar atmosphere followed by a 5 minute rest period. A cycle having a 10 minute mixing period and a 5-minute rest period was repeated for 24 hours to obtain a mixture. The obtained mixture was put into a furnace and then calcined at 260° C. for 4 hours to obtain a crystallized solid ion conductor compound having the composition given in Table 1 below.

Subsequently, for XRD analysis, the obtained solid ion conductor compound was pressed with a uniaxial pressure of 200 MPa to prepare a pellet having a thickness of about 10 mm and a diameter of about 13 mm.

Comparative Example 2

A solid ion conductor compound having the composition given in Table 1 below was obtained in the same manner as in Comparative Example 1, except that the stoichiometric ratio of the lithium precursor and the holmium precursor was changed to 3.25:1. The obtained solid ion conductor compound was molded to prepare a pellet.

Comparative Example 3

LiCl as a lithium precursor, and $HoCl_3$ as a holmium precursor were put into a planetary ball mill at a stoichiometric ratio of 3:1 in a glove box of an Ar atmosphere, zirconia (YSZ) balls were added, the resulting materials were pulverized and mixed for 10 minutes at 700 rpm under an Ar atmosphere, rested for a period of 5 minutes, and then the mixing/resting cycle was repeated for 24 hours, so as to obtain a solid ion conductor compound having the composition given in Table 1 below. Subsequently, for XRD analysis, the obtained solid ion conductor compound was pressed with a uniaxial pressure of 200 MPa to prepare a pellet having a thickness of about 10 mm and a diameter of about 13 mm.

Comparative Example 4

LiCl as a lithium precursor, and $HoCl_3$ as a holmium precursor were put into a planetary ball mill at a stoichiometric ratio of 3:1 in a glove box of an Ar atmosphere, zirconia (YSZ) balls were added, the resulting materials were pulverized and mixed for 10 minutes at 700 rpm under an Ar atmosphere, rested for a period of 5 minutes, and then the mixing/resting cycle was repeated for 24 hours to obtain a mixture. The obtained mixture was put into a furnace and then calcined at 260° C. for 4 hours to obtain a crystallized solid ion conductor compound having the composition given in Table 1 below. Subsequently, for XRD analysis, the obtained solid ion conductor compound was pressed with a uniaxial pressure of 200 MPa to prepare a pellet having a thickness of about 10 mm and a diameter of about 13 mm.
Manufacture of All-Solid Secondary Battery Example 5

(Preparation of Cathode Layer)
As a cathode active material, $LiNi_{0.8}Co_{0.15}Mn_{0.050}O_2$ (NCM) was prepared. As a solid electrolyte, a powder was prepared by pulverizing the pellets of the solid ion conductor compound prepared in Example 1. As a conducting agent, carbon nanofibers (CNF) were prepared. Further, as a binder, polytetrafluoroethylene (PTFE) was prepared. These materials were mixed at a weight ratio of cathode active material: solid ion conductor compound:conducting agent:binder of 77:23:0.4:1.2 to prepare a cathode mixture.
The prepared cathode mixture was applied to a current collector and dried to prepare a cathode layer. Then, the cathode layer was processed using an 11 mm punching machine to obtain a cathode layer having a thickness of 50 μm and a diameter of 11 mm.

(Preparation of Solid Electrolyte)
The solid ion conductor compound prepared in Example 1 was pulverized using an agate mortar to obtain a solid electrolyte powder. The solid electrolyte powder is pressed by a uniaxial pressure of 200 MPa. To prepare a solid electrolyte in the form of a pellet having a thickness of about 500 μm and a diameter of about 12 mm.
(Preparation of Anode Layer)
As an anode, a metal lithium foil having a thickness of 30 μm was prepared.
(Manufacture of All-Solid Secondary Battery)
An anode layer, a solid electrolyte layer, and a cathode layer were sequentially stacked on a SUS lower electrode, and then pressed at 250 MPa for 3 minutes using a cold isostatic press (CIP) to manufacture an all-solid secondary battery.

Example 6

An all-solid secondary battery was manufactured in the same manner as in Example 5, except that the solid ion conductor compound obtained in Example 4 was used as a solid electrolyte.

Evaluation Example 1

X-Ray Diffraction Experiment

Figure 2A:
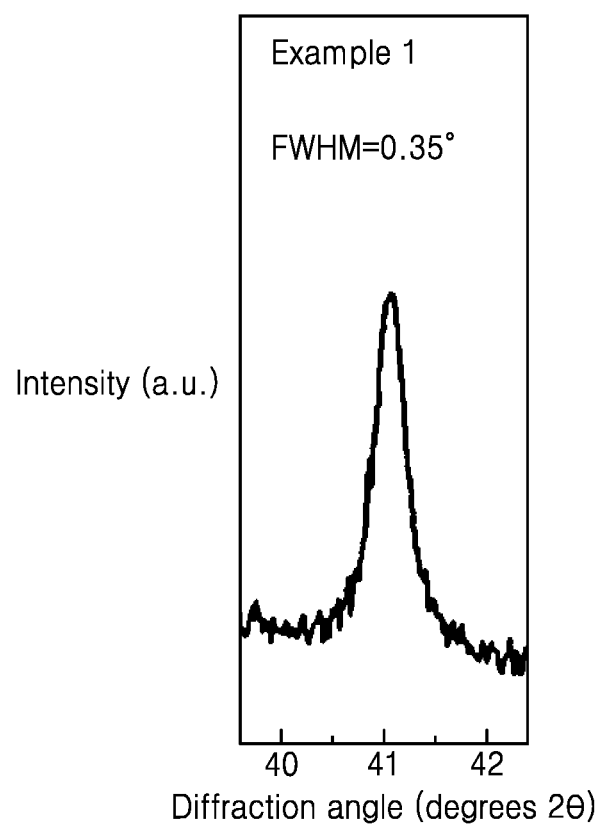
FIG. 2A is an enlarged view of a portion of the XRD pattern of Example 1, which shows the full width at half maximum (FWHM) of the peak at diffraction angle 2' of 40° to 44° in the XRD pattern of Example 1.
Figure 2B:
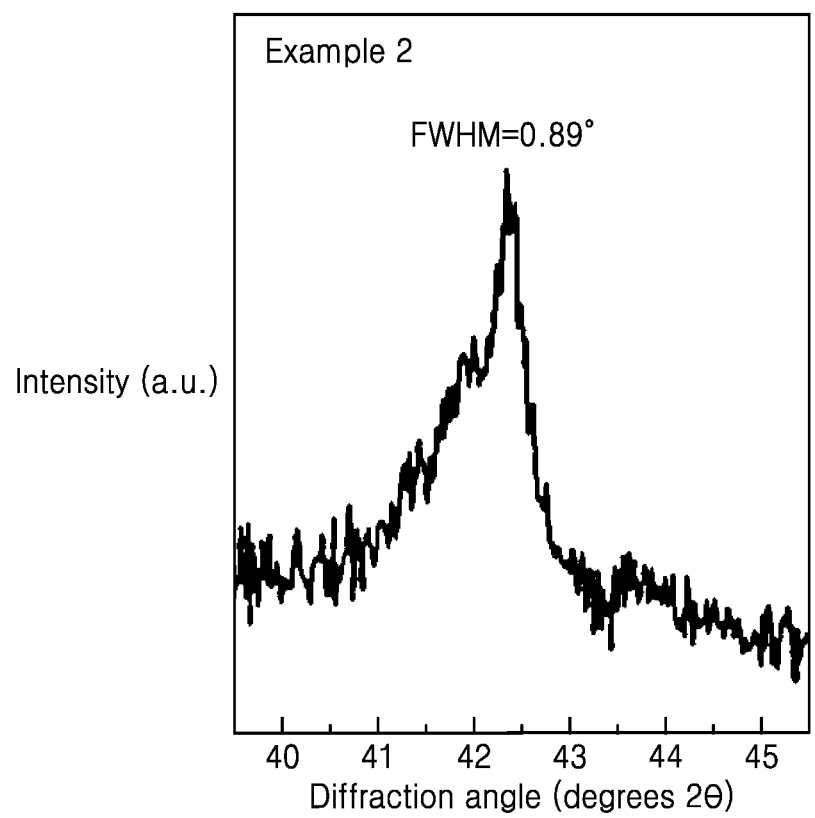
FIG. 2B is an enlarged view of a portion of the XRD pattern of Example 2, which shows the full width at half maximum (FWHM) of the peak at diffraction angle 2θ of 40° to 44° in the XRD pattern of Example 2.
Figure 2C:
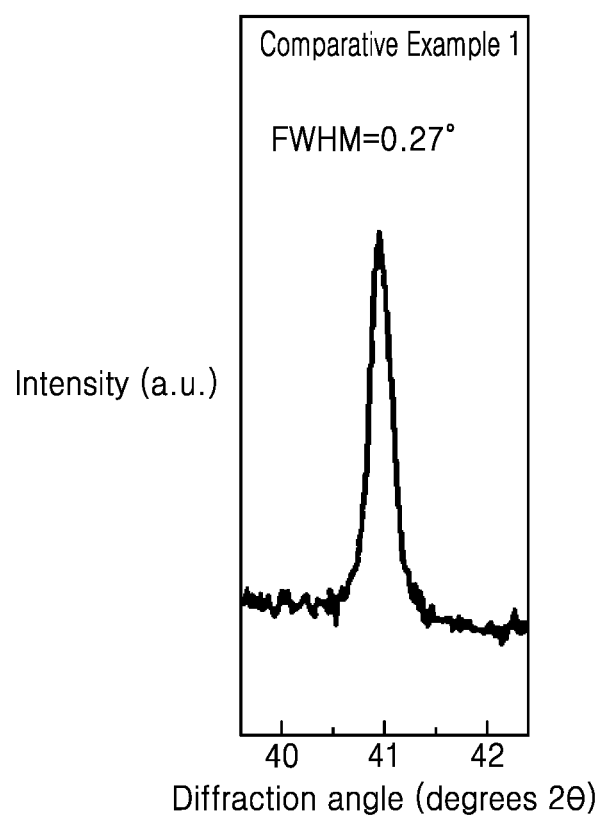
FIG. 2C is an enlarged view of a portion of the XRD pattern of Comparative Example 1, which shows the full width at half maximum (FWHM) of the peak at the diffraction angle 2θ of 40° to 44° in the XRD pattern

Powder was prepared by pulverizing the solid ion conductor compounds prepared in Examples 1 to 4 and Comparative Examples 1 to 4 using an agate mortar, and then the XRD spectrum for each powder was measured, and the results thereof are given in Table 1 below. The XRD spectra of Example 1 and Comparative Example 1 are shown in FIG. 1. Further, for Examples 1 and 2 and Comparative Example 1, enlarged views showing the regions of the XRD spectrum including the peak at diffraction angle 2θ of 40° to 44° are shown in FIGS. 2A to 2C. Cu Kα radiation was used for XRD spectrum measurement.
Examples 1 to 4 have XRD diffraction peaks similar to those of Comparative Examples 1 and 2, but which are different from the diffraction peaks of Comparative Examples 3 and 4. Meanwhile, it may be found that in Examples 1 and 2 in which heat treatment was not performed, the full width at half maximum (FWHM) of the peak at the diffraction angle 2θ of 40°2θ to 44°2θ, is 0.35°2θ and 0.96°2θ, respectively, whereas in Comparative Example 1 in which the heat treatment was performed, the full width at half maximum (FWHM) thereof is 0.27°2θ. This suggests that in Comparative Example 1, more crystallization occurs due to the heat treatment, and on the contrary, in Examples 1 and 2, an amorphous phase is included.

Evaluation Example 2

Measurement of Ion Conductivity

Each of the solid ion conductor compounds prepared in Examples 1 to 5 and Comparative Examples 1 to 4 was pulverized using an agate mortar to obtain a powder. Then, 200 milligrams (mg) of the powder was pressed by a pressure of 4 ton/cm² for 2 minutes to prepare a pellet specimen having a thickness of about 0.101 mm and a diameter of about 13 mm. Gold (Au) electrodes having a thickness of 50 μm were provided on both surfaces of the prepared specimen to prepare a symmetric cell. The preparation of the symmetric cell was carried out in a glovebox under an Ar atmosphere.

The impedance of the pellet was measured by a 2-probe method using an impedance analyzer (Material Mates 7260 impedance analyzer) with respect to the specimen in which gold electrodes are provided on both side surfaces thereof. In this case, the frequency range was 1 Hertz (Hz) to 1 megahertz (MHz), and the amplitude voltage was 10 millivolts (mV). The impedance of the pellet was measured at 25° C. under an Ar atmosphere. The resistance value was calculated from the arc of the Nyquist plot for the impedance measurement result, and the ionic conductivity was calculated by considering the area and thickness of the specimen. The measurement results are shown in Table 1 and FIGS. 3A and 3B.

Figure 4:
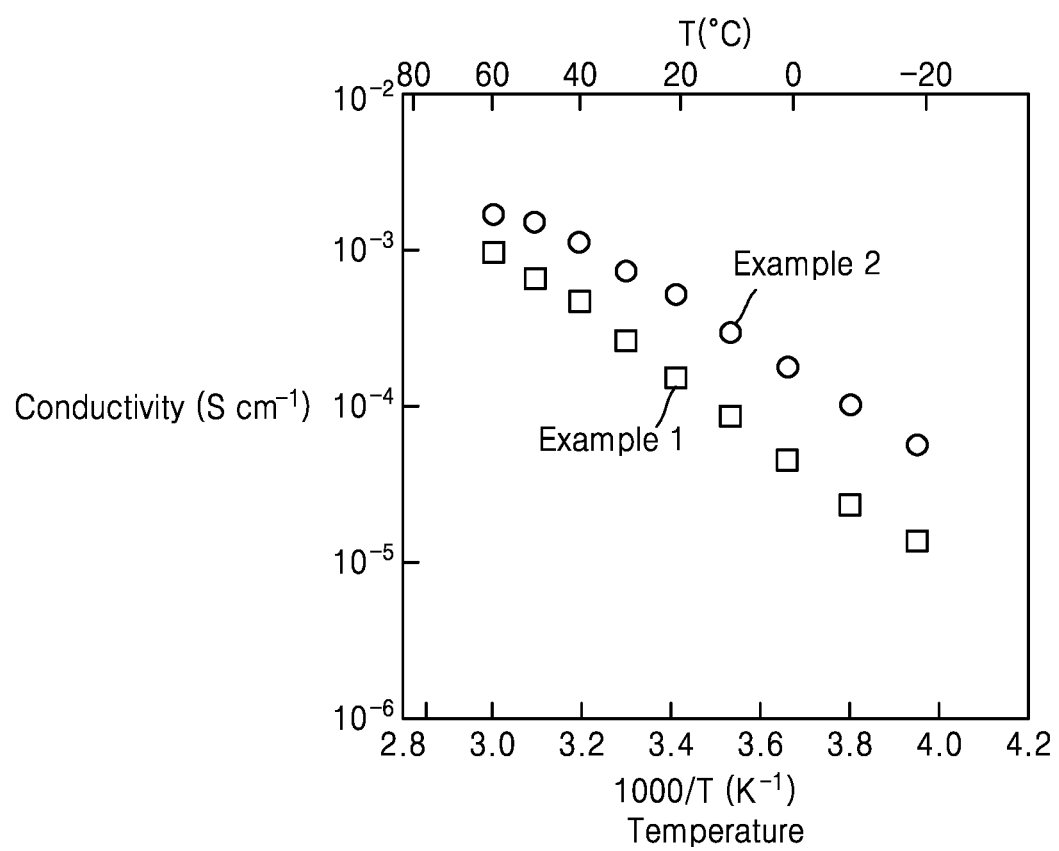
FIG. 4 is a graph of conductivity (Siemens per centimeter, S/cm) versus temperature (° C. and 1000/T, Kelvin$^{-1}$ (K$^{-1}$)), illustrating the changes in ion conductivity with temperature of the solid ion conductor compounds of Examples 1 and 2.

Further, the ion conductivity according to temperature was measured for the symmetric cell prepared using the solid ion conductor compounds prepared in Examples 1 and 2, and the measurement results are shown in FIG. 4.

Comparing Example 1 and Comparative Example 1 having substantially the same XRD peak and composition, the solid ion conductor compound of Example 1, which was not subjected to heat treatment, exhibits about $10^6$ times greater ionic conductivity than the solid ion conductor compound of Comparative Example 1 subjected to heat treatment. Similarly, the solid ion conductor compound of Example 3, not subjected to heat treatment, exhibits about $10^3$ times greater ionic conductivity than the solid ion conductor compound of Comparative Example 2 subjected to heat treatment. Further, the solid ion conductor compound of Example 3, not subjected to heat treatment, exhibits equal to or about $10^3$ times greater ionic conductivity than Li—In—Cl (LIC)-based solid ion conductor compounds (Comparative Examples 3 and 4). Despite not performing heat treatment for crystallization, the solid ion conductor compounds of Examples 1 to 4 of the present application have ionic conductivity similar to or greater than the ionic conductivity of a halogen-based solid ion conductor prepared through a known crystallization process. Such high ionic conductivity is thought to be due to the inclusion of a mixed phase of an amorphous phase according to the introduction of Ho element and the omission of heat treatment.

Figure 3A:
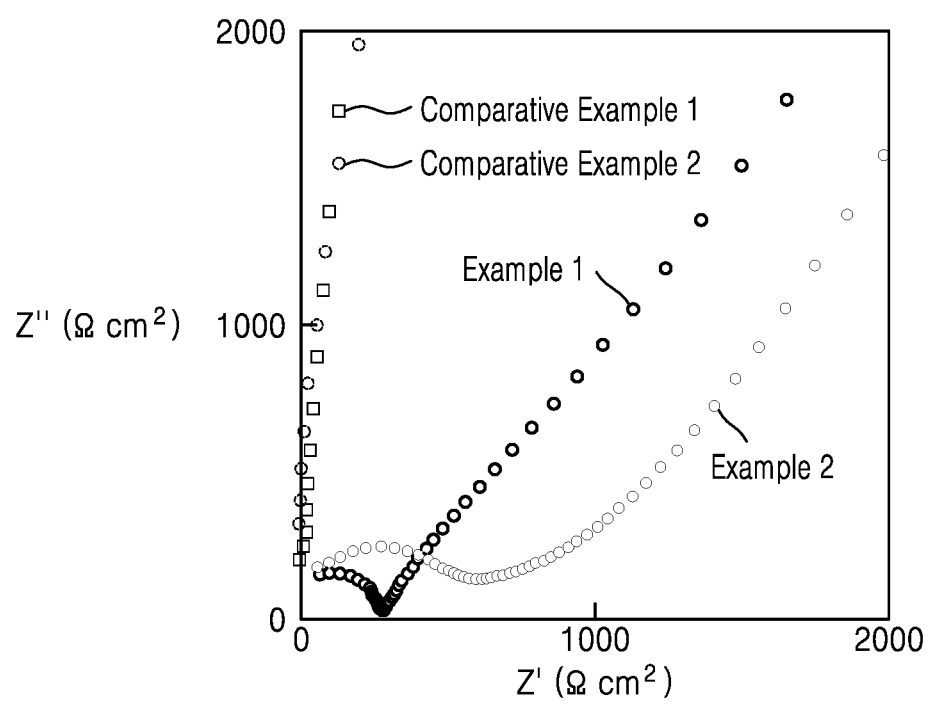
FIGS. 3A and 3B are graphs of the reactive portion of the impedance $-Z''$ (ohm square centimeter, $\Omega \cdot cm^2$) versus the resistive portion of the impedance $Z'$ ($\Omega \cdot cm^2$), showing the results of electrochemical impedance spectroscopy (EIS) evaluation of the solid ion conductor compounds obtained in Examples 1 and 2 and Comparative Examples 1 and 2.
Figure 3B:
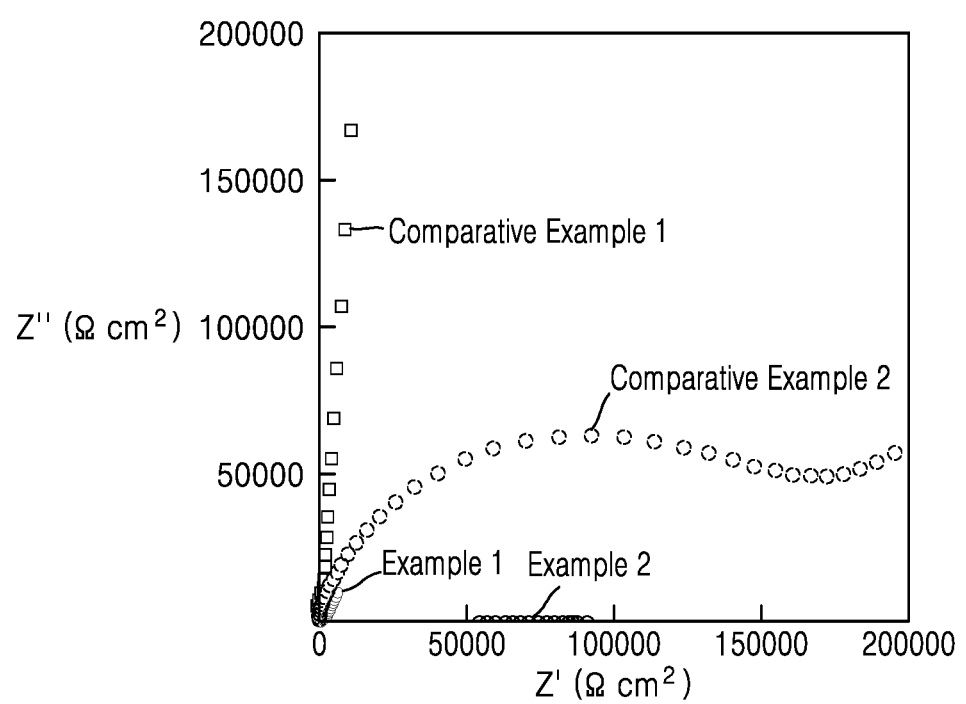

Further, referring to FIGS. 3A and 3B, it may be seen that the electrode resistance of the cells to which the solid ion conductor compounds of Examples 1 and 2 are applied is significantly less than that of the cells of Comparative Examples 1 and 2.

Further, referring to FIG. 4, it may be found that Examples 1 and 2 have an ionic conductivity of $1 \times 10^{-4}$ or greater at room temperature, and maintain high ionic conductivity over a wide range.

TABLE 1

| | Solid ion conductor compound | Presence or absence of heat treatment | XRD peak (°2θ) | FWHM for the peak at 40 °2θ to 43 °2θ (°2θ) | Conductivity (Scm$^{-1}$) |
|---|---|---|---|---|---|
| Example 1 | Li$_3$HoCl$_6$ | absence | 30.26, 31.54, 34.88, 40.99, 48.94, 59.57 | 0.35 | 2.0 × 10$^{-4}$ |
| Example 2 | Li$_3$HoCl$_5$Br | absence | 30.27, 31.55, 34.52, 42.36, 48.21, 60.23 | 0.96 | 3.0 × 10$^{-4}$ |
| Example 3 | Li$_{2.25}$HoCl$_{5.25}$ | absence | 30.19, 31.52, 35.00, 41.15, 49.04, 59.73 | 0.38 | 1.8 × 10$^{-4}$ |
| Example 4 | Li$_{3.25}$HoCl$_{6.25}$ | absence | 30.29, 31.58, 34.87, 41.02, 49.14, 59.48 | 0.39 | 1.7 × 10$^{-4}$ |
| Comparative Example 1 | Li$_3$HoCl$_6$ | presence | 30.18, 31.45, 34.97, 40.92, 48.78, 59.69 | 0.27 | 1.9 × 10$^{-10}$ |
| Comparative Example 2 | Li$_{2.25}$HoCl$_{5.25}$ | presence | 29.7, 31.32, 34.64, 40.82, 48.75, 58.88 | 0.16 | 6.1 × 10$^{-7}$ |
| Comparative Example 3 | Li$_3$InCl$_6$ | absence | 34.51, 49.52 | 0.39 (for 49.52 °2θ) | 1.3 × 10$^{-6}$ |
| Comparative Example 4 | Li$_3$InCl$_6$ | presence | 34.50, 49.56 | 0.16 (for 49.56 °2θ) | 1.2 × 10$^{-4}$ |

Evaluation Example 3

Initial Charge-Discharge Test

The charge-discharge characteristics of the all-solid secondary batteries manufactured in Examples 5 and 6 were evaluated by the following charge-discharge test.

In the first cycle of the charge-discharge test, each of the all-solid secondary batteries was charged with a constant current of 0.05 C until a battery voltage reached 4.0 volts (V), and charged with a constant voltage of 4.0 V until a current value reached 0.05 C. Subsequently, each of the all-solid secondary batteries was discharged with a constant current of 0.05 C until the battery voltage reached 2.0 V. A C rate means a current which will discharge a battery in one hour, e.g., a C rate for a battery having a discharge capacity of 1.6 ampere-hours would be 1.6 amperes.

Figure 5:
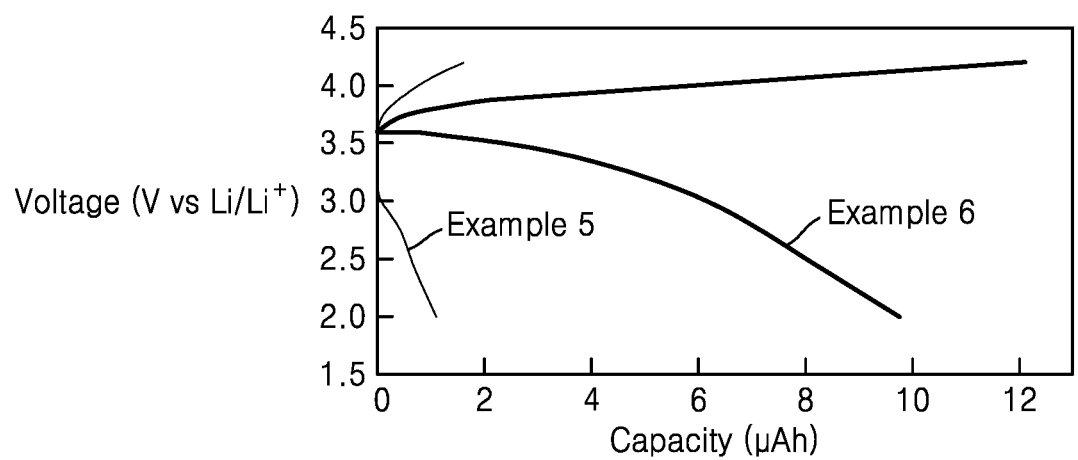
FIG. 5 is a graph of voltage (volts (V) versus Li/Li$^+$) versus capacity (microampere hours, μAh), which illustrates the initial charge-discharge curves of the all-solid lithium secondary batteries of Examples 5 and 6.

The initial charge-discharge curve is shown in FIG. 5.

Referring to FIG. 5, since it may be seen that the charge-discharge cycle proceeds stably, it is proved that the solid ion conductor compounds obtained in Examples 1 and 4 of the present disclosure are applicable to an all-solid lithium battery.

According to an aspect, an electrochemical cell having improved stability and cycle characteristics is provided by including a solid ion conductor compound having improved lithium ion conductivity, It should be understood that aspects described herein should be considered in a descriptive sense only and not for purposes of limitation. Descriptions of features or aspects should be considered as available for other similar features or aspects. While one or more aspects have been described with reference to the figures, it will be understood by those of ordinary skill in the art that various changes in form and details may be made therein without departing from the spirit and scope as defined by the following claims.

What is claimed is:

1. A solid ion conductor compound represented by Formula 1:

$$Li_aM_xHo_yX_z$$ Formula 1 wherein, in Formula 1,
X is F, Cl, Br, I, or a combination thereof,
M is a metal element and is a divalent metal, a trivalent metal, a tetravalent metal, or a combination thereof, and
$1 \le a \le 4$, $0 \le x < 1.5$, $0.5 \le y \le 1.5$, and $4 \le z \le 9$,
wherein the compound has X-ray diffraction peaks at 30° 2θ to 33° 2θ, 33° 2θ to 36° 2θ, 40° 2θ to 44° 2θ, and 48° 2θ to 52° 2θ, when analyzed using CuKα radiation, and
wherein a full width at half maximum of at least one peak at 40° 2θ to 44° 2θ is 0.35° 2θ or greater.

2. The solid ion conductor compound of claim 1, wherein the solid ion conductor compound has an X-ray diffraction spectrum comprising diffraction peaks at 30° 2θ±0.5° 2θ, 31.5° 2θ±0.5° 2θ, 35° 2θ±0.5° 2θ, 41° 2θ±0.5° 2θ, 48.7° 2θ±0.5° 2θ, and 60° 2θ±0.5° 2θ, when analyzed using CuKα radiation.

3. The solid ion conductor compound of claim 1, wherein the solid ion conductor compound has an X-ray diffraction spectrum comprising diffraction peaks at 30° 2θ±0.5° 2θ, 31.5° 2θ±0.5° 2θ, 35° 2θ±0.5° 2θ, 42° 2θ±0.5° 2θ, 48.7° 2θ±0.5° 2θ, and 60° 2θ±0.5° 2θ, when analyzed using CuKα radiation.

4. The solid ion conductor compound of claim 1, wherein the halogen is Cl.

5. The solid ion conductor compound of claim 1, wherein the halogen element is Cl and Br.

6. The solid ion conductor compound of claim 1, wherein the solid ion conductor compound comprises a first crystalline phase, a second crystalline phase, and an amorphous phase, and
the first crystalline phase and the second crystalline phase are the same or are different from each other, and
the amorphous phase is between the first crystalline phase and the second crystalline phase.

7. The solid ion conductor compound of claim 6, wherein the first crystalline phase, the second crystalline phase, or both the first crystalline phase and the second crystalline phase have a layered rock salt crystal structure.

8. The solid ion conductor compound of claim 6, wherein the first crystalline phase and the second crystalline phase each independently have a structure belonging to a C2/m space group, a P3m1 space group, or a combination thereof.

9. The solid ion conductor compound of claim 1, wherein the solid ion conductor compound has an ionic conductivity of about 10¹ Siemens per centimeter or more at 25° C.

10. The solid ion conductor compound of claim 1, wherein the solid ion conductor compound is represented by Formula 2:

$$Li_aM_xHo_yX1_{z1}X2_{z2}$$ Formula 2 wherein, in Formula 2,
X1 is Cl,
X2 is F, Br, I, or a combination thereof,
M is a metal element and is a divalent metal, a trivalent metal, a tetravalent metal, or a combination thereof, and
$1 \le a \le 4$, $0 \le x < 1.5$, $0.5 \le y \le 1.5$, $4 \le z1 < 9$, and $0 < z2 \le 5$.

11. The solid ion conductor compound of claim 10, wherein X2 is Br.

12. The solid ion conductor compound of claim 10, wherein M is Mg, Ca, Ba, Sr, In, Ga, Al, Ln, Ti, Zr, Hf, W, or a combination thereof.

13. The solid ion conductor compound of claim 1, wherein the solid ion conductor compound is $Li_{3-2x}Mg_xHoCl_6$ wherein $0<x<1.5$, $Li_{3-2x}Ca_xHoCl_6$ wherein $0<x<1.5$, $Li_{3-2x}Ba_xHoCl_6$ wherein $0<x<1.5$, $Li_{3-2x}Sr_xHoCl_6$ wherein $0<x<1.5$, $Li_{3-3x}In_xHoCl_6$ wherein $0<x<1$, $Li_{3-3x}Ga_xHoCl_6$ wherein $0<x<1$, $Li_{3-3x}Al_xHoCl_6$ wherein $0<x<1$, $Li_{3-3x}Ln_xHoCl_6$ wherein $0<x<1$, $Li_{3-4x}Ti_xHoCl_6$ wherein $0<x<0.75$, $Li_{3-4x}Zr_xHoCl_6$ wherein $0<x<0.75$, $Li_{3-4x}Hf_xHoCl_6$ wherein $0<x<0.75$, $Li_{3-4x}W_xHoCl_6$ wherein $0<x<0.75$, $Li_{3-2x}Mg_xHoCl_5Br$ wherein $0<x<1.5$, $Li_{3-2x}Ca_xHoCl_5Br$ wherein $0<x<1.5$, $Li_{3-2x}Ba_xHoCl_5Br$ wherein $0<x<1.5$, $Li_{3-2x}Sr_xHoCl_5Br$ wherein $0<x<1.5$, $Li_{3-3x}In_xHoCl_5Br$ wherein $0<x<1$, $Li_{3-3x}Ga_xHoCl_5Br$ wherein $0<x<1$, $Li_{3-3x}Al_xHoCl_5Br$ wherein $0<x<1$, $Li_{3-3x}Ln_xHoCl_5Br$ wherein $0<x<1$, $Li_{3-4x}Ti_xHoCl_5Br$ wherein $0<x<0.75$, $Li_{3-4x}Zr_xHoCl_5Br$ wherein $0<x<0.75$, $Li_{3-4x}Hf_xHoCl_5Br$ wherein $0<x<0.75$, $Li_{3-4x}W_xHoCl_5Br$ wherein $0<x<0.75$, $Li_3HoCl_6$, $Li_3HoCl_5Br$, $Li_{2.25}HoCl_{5.25}$, $Li_{3.25}HoCl_{6.25}$, or a combination thereof.

14. A solid electrolyte comprising the solid ion conductor compound of claim 1.

15. An electrochemical cell comprising:
a cathode layer comprising a cathode active material layer;
an anode layer comprising an anode active material layer; and
an electrolyte layer between the cathode layer and the anode layer,
wherein the cathode active material layer, the electrolyte layer, or a combination of both the cathode active material layer and the electrolyte layer comprise the solid ion conductor compound of claim 1.

16. The electrochemical cell of claim 15, wherein the electrochemical cell is an all-solid secondary battery.

17. A method of preparing a solid ion conductor compound, the method comprising:
providing a mixture comprising a lithium precursor and a holmium precursor; and
reacting the mixture in a solid phase to obtain the solid ion conductor compound represented by Formula 1:

$$Li_aM_xHo_yX_z$$ Formula 1 wherein, in Formula 1,
X is F, Cl, Br, I, or a combination thereof,
M is a metal element and is a divalent metal, a trivalent metal, a tetravalent metal, or a combination thereof, and
$1 \le a \le 4$, $0 \le x < 1.5$, $0.5 \le y \le 1.5$, and $4 \le z \le 9$,
wherein the compound has X-ray diffraction peaks at 30° 2θ to 33° 2θ, 33° 2θ to 36° 2θ, 40° 2θ to 44° 2θ, and 48° 2θ to 52° 2θ, when analyzed using CuKα radiation, and
wherein a full width at half maximum of at least one peak at 40° 2θ to 44° 2θ is 0.35° 2θ or greater.

18. The method of claim 17, wherein the reacting of the mixture in the solid phase comprises:
ball-mill-mixing the mixture in an inert atmosphere.

19. The method of claim 18, wherein the ball-mill-mixing comprises a cycle alternating between a first time interval and a second time interval, wherein the first time interval comprises the ball-mill mixing and the second time interval comprises a rest period.

20. The method of claim 19, wherein the cycle is repeated for a time period of about 22 hours to about 26 hours.

21. The method of claim 18, wherein the reacting of the mixture further comprises drying the mixture.

22. The method of claim 17, wherein the solid ion conductor compound is prepared at a temperature of about 20° C. to about 25° C., and the method does not comprise a calcination step.

\* \* \* \* \*